(12) United States Patent
Savatsky et al.

(10) Patent No.: US 9,221,937 B2
(45) Date of Patent: Dec. 29, 2015

(54) METHODS AND SYSTEMS FOR OLEFIN POLYMERIZATION

(71) Applicant: Univation Technologies, LLC, Houston, TX (US)

(72) Inventors: Bruce J. Savatsky, Kingwood, TX (US); R. Eric Pequeno, Baytown, TX (US); Timothy R. Lynn, Glen Gardner, NJ (US); F. David Hussein, Hilton Head Island, SC (US); Daniel P. Zilker, Jr., Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/409,261

(22) PCT Filed: Jun. 19, 2013

(86) PCT No.: PCT/US2013/046480
§ 371 (c)(1),
(2) Date: Dec. 18, 2014

(87) PCT Pub. No.: WO2014/022006
PCT Pub. Date: Feb. 6, 2014

(65) Prior Publication Data
US 2015/0183905 A1   Jul. 2, 2015

Related U.S. Application Data

(60) Provisional application No. 61/677,802, filed on Jul. 31, 2012.

(51) Int. Cl.
| C08F 4/00 | (2006.01) |
|---|---|
| C08F 10/14 | (2006.01) |
| C08F 2/00 | (2006.01) |
| C08F 210/16 | (2006.01) |
| C08F 2/01 | (2006.01) |
| C08F 2/34 | (2006.01) |
| C08F 4/659 | (2006.01) |
| C08F 4/6592 | (2006.01) |

(52) U.S. Cl.
CPC .............. *C08F 210/16* (2013.01); *C08F 2/01* (2013.01); *C08F 2/34* (2013.01); *C08F 4/65912* (2013.01); *C08F 4/65925* (2013.01)

(58) Field of Classification Search
CPC ............ C08F 2/01; C08F 2/34; C08F 210/16; C08F 10/02; C08F 4/65904; C08F 4/64148; C08F 4/65925; C08F 4/65912; C08F 210/14; C08F 2500/12; C08F 2500/18
USPC .................. 526/89, 90, 118, 348.5
See application file for complete search history.

(56) References Cited

U.S. PATENT DOCUMENTS

| 6,391,986 B1* | 5/2002 | Goode | .................... C08F 10/00 526/68 |
| 7,989,562 B2* | 8/2011 | Terry | ...................... B01J 4/002 422/111 |

FOREIGN PATENT DOCUMENTS

WO   WO 2008/042078   4/2008

*Primary Examiner* — William Cheung
(74) *Attorney, Agent, or Firm* — Brooks, Cameron & Huebsch, PLLC

(57) ABSTRACT

Methods and systems for olefin polymerization are provided. The method for olefin polymerization can include flowing a catalyst through an injection nozzle and into a fluidized bed disposed within a reactor. The method can also include flowing a feed comprising one or more monomers, one or more inert fluids, or a combination thereof through the injection nozzle and into the fluidized bed. The feed can be at a temperature greater than ambient temperature. The method can also include contacting one or more olefins with the catalyst within the fluidized bed at conditions sufficient to produce a polyolefin.

19 Claims, 3 Drawing Sheets

METHODS AND SYSTEMS FOR OLEFIN POLYMERIZATION

CROSS-REFERENCE TO RELATED APPLICATIONS

This application is a National Stage application under 35 U.S.C. §371 of International Application No. PCT/US2013/046480, filed Jun. 19, 2013, that claims the benefit of Ser. No. 61/677,802, filed Jul. 31, 2012, the disclosures of which are incorporated by reference in their entireties.

BACKGROUND

In gas phase polymerization, a gaseous stream containing one or more monomers is passed through a fluidized bed under reactive conditions in the presence of a catalyst. A polymer product is withdrawn from the reactor while fresh monomer is introduced to the reactor to replace the removed polymerized product. Unreacted monomer and catalyst is withdrawn from the fluidized bed and recycled back to the reactor.

Ongoing efforts have been directed to increasing the catalyst activity of the various catalyst compositions used to make polyolefins. For example, production of bimodal polyolefins using a mixed catalyst system that includes at least one metallocene catalyst compound requires a large amount of activator and/or a large amount of the metallocene catalyst compound in order to produce commercial quantities of bimodal polyolefins. Such activators are expensive and the amount of activator required to produce an active catalyst for polymerization has been a substantial impediment to the commercialization of metallocene catalysts for polyolefin production.

There is a need, therefore, for improved methods for increasing the catalyst productivity of various catalyst compositions used for making polyolefins.

SUMMARY

Methods and systems for olefin polymerization are provided. The method for olefin polymerization can include flowing a catalyst through an injection nozzle and into a fluidized bed disposed within a reactor. The method can also include flowing a feed comprising one or more monomers, one or more inert fluids, or a combination thereof through the injection nozzle and into the fluidized bed. The feed can be at a temperature greater than ambient temperature. The method can also include contacting one or more olefins with the catalyst within the fluidized bed at conditions sufficient to produce a polyolefin.

DETAILED DESCRIPTION

Figure 1:
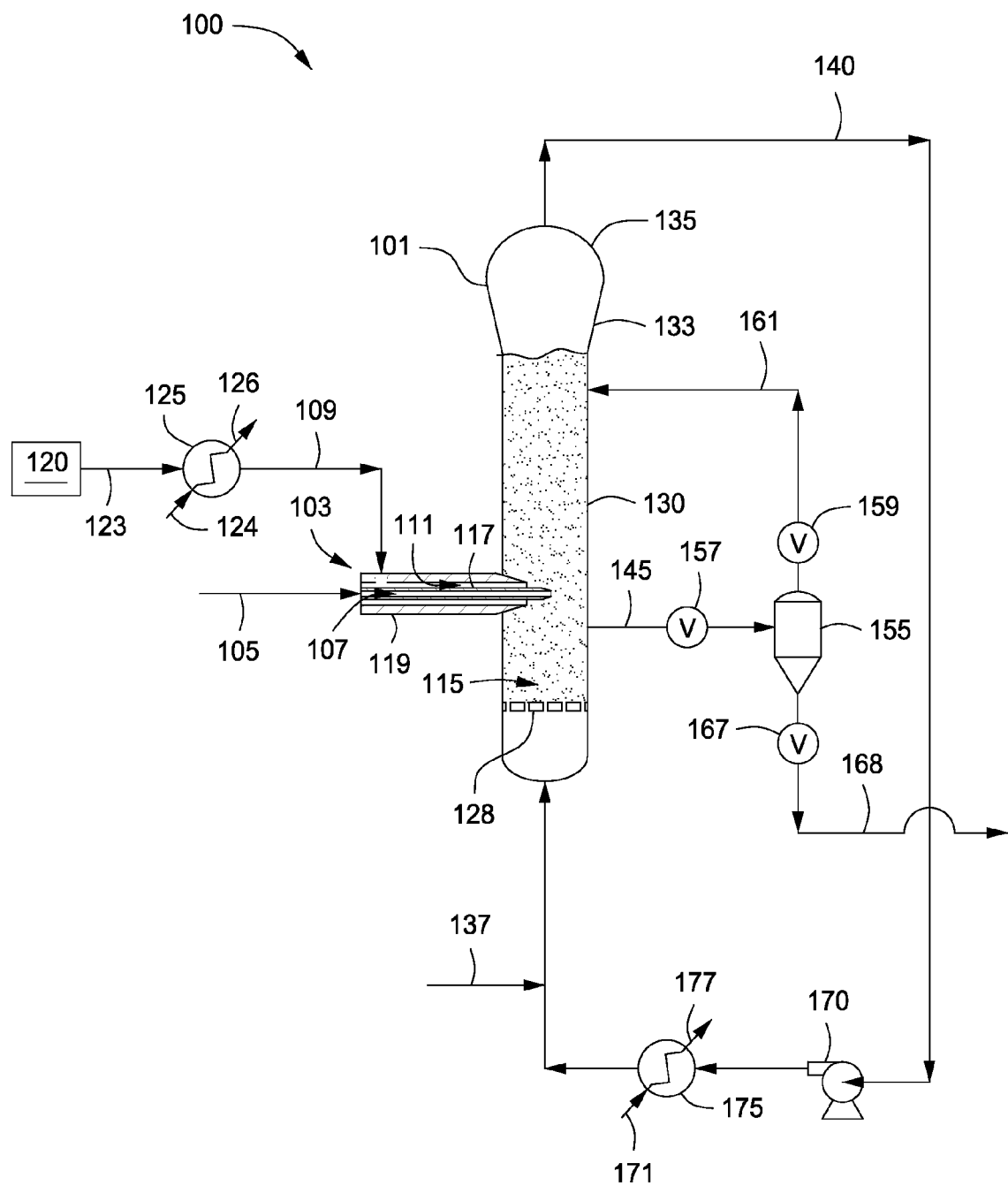
FIG. 1 depicts an illustrative gas phase polymerization system for making polymers.

FIG. 1 depicts an illustrative gas phase polymerization system 100 for making one or more polymers. The polymerization system 100 can include a reactor 101 in fluid communication with one or more catalyst injection nozzles or tubes 103, one or more discharge tanks 155, compressors 170, and heat exchangers 175. One or more catalysts or catalyst systems via line 105 and one or feeds via line 109 can be introduced to a fluidized bed 115 disposed within the reactor 101 via the nozzle 103. The fluidized bed 115 has the general appearance of a dense mass of individually moving particles created by the percolation of a cycle or "recycle" gas flowing therethrough. The recycle gas can be recovered from and recycled to the reactor 101 via one or more recycle lines 140.

The nozzle 103 can convey, transport, direct, inject, disperse, distribute, or otherwise introduce the catalyst in line 105 into the fluidized bed 115 via one or more first flow paths 107 formed through the nozzle 103. For purposes of this disclosure, the terms "catalyst" and "catalyst system" are intended to be interchangeable and include any element and/or compound that is capable of catalyzing the polymerization or oligomerization of one or more olefins. The nozzle 103 can also convey, transport, direct, inject, or otherwise introduce the feed in line 109 into the fluidized bed 115 via one or more second flow paths 111 formed through the nozzle 103. The feed in line 109 can be or include one or more monomers, one or more inert gases, one or more inert liquids, or any combination thereof.

The first flow path 107 can be at least partially surrounded by the second flow path 111. For example, the first flow path 107 can be a bore or other passageway formed through a first conduit or "catalyst conduit" 117. The first conduit 117 can be at least partially disposed within a second conduit or "support conduit" 119. The second flow path 111 can be an annulus or other passageway defined between the outer surface of the catalyst conduit 117 and the inner surface of the support conduit 119. The first conduit 117 and the second conduit 119 can be concentric. The nozzle 103 can also be referred to as a "tube in a support tube nozzle."

The feed in line 109 can be provided via line 123 from one or more sources 120. For example, the source 120 can be a plenum, header, tank, pipeline, or the like. The polymerization system 100 can also include one or more heat exchangers 125 that can heat the feed in line 123 to provide the feed in line 109 above ambient temperature. The feed via line 123 and a heat transfer medium via line 124 can be introduced to the heat exchanger 125 to provide the feed in line 109 at a temperature greater than ambient temperature and a cooled heat transfer medium via line 126. Although not shown, the feed in line 123 at a temperature at or below ambient can be introduced directly to the nozzle 103 and the nozzle 103 can be configured or adapted to heat the feed within the nozzle 103. For example, the support tube 119 can include one or more heating elements, heating jackets, or the like that can transfer sufficient heat to the feed as the feed flows through the second flow path 111 and into the fluidized bed 115.

It has been surprisingly and unexpectedly discovered that heating the feed in line 123 to provide the feed via line 109 at a temperature above an ambient or environmental temperature at which the polymerization system 100 is operating can significantly increase the productivity of the catalyst in line 105. For example, if the ambient temperature is 25° C. where the polymerization system 100 is operating, then the feed in line 123 can be heated via heat exchanger 125 to a temperature above 25° C. The productivity of the catalyst in line 105 can be increased within the reactor 100 at least 1%, at least 3%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, at least 105%, at least 110%, at least 115%, or at least 120% by increasing the temperature of the feed in line 109 to greater than the ambient temperature where the polymerization system 100 is being operated. For example, the productivity of the catalyst can be increased within the reactor 101 by increasing the temperature of the support to flow in line 109 to greater than the ambient temperature where the polymerization system 100 is being operated in an amount from a low of about 1%, about 10%, about 25%, about 45%, about 55%, about 60%, about 65% or about 70% to a high of about 95%, about 110%, about 125%, about 150%, about 160%, about 170%, about 180%, about 190%, about 200%, about 210%, or about 225%, with suitable ranges comprising the combination of any two values. In another example, the productivity of the catalyst can be increased within the reactor 101 by increasing the temperature of the support to flow in line 109 to greater than the ambient temperature where the polymerization system 100 is being operated in an amount from a low of about 1%, about 3%, about 5%, about 10%, about 12%, about 15%, about 17% or about 20% to a high of about 30%, about 33%, about 35%, about 37%, about 40%, about 45%, about 50%, about 55%, about 50%, about 55%, or about 60%, with suitable ranges comprising the combination of any two values. In still another example, the productivity of the catalyst can be increased by about 5% to about 15%, about 10% to about 25%, about 15% to about 35%, about 25% to about 45%, about 30% to about 45%, about 30% to about 50%, about 35% to about 60%, about 14% to about 40.5%, or about 31% to about 40.5% by increasing the temperature of the feed in line 109 to a temperature greater than the ambient temperature where the polymerization system 100 is being operated. In yet another example, the productivity of the catalyst can be increased by about 15% to about 45%, about 40% to about 80%, about 55% to about 95%, about 85% to about 105%, about 70% to about 120%, about 100% to about 160%, about 125% to about 175%, about 140% to about 210%, or about 130% to about 190% by increasing the temperature of the feed in line 109 to a temperature greater than the ambient temperature where the polymerization system 100 is being operated.

The temperature of the feed in line 109 can be greater than ambient temperature and up to about a temperature of the fluidized bed 115, equal to the temperature of the fluidized bed 115, or greater than the temperature of the fluidized bed. The temperature of the feed in line 109 can be at a temperature from a low of about 25° C., about 35° C., about 45° C., or about 55° C. to a high of about 70° C., about 80° C., about 90° C., about 100° C., or about 110° C., with suitable ranges comprising the combination of any two values. For example, the temperature of the feed in line 109 can be from about 50° C. to about 110° C., about 70° C. to about 100° C., about 85° C. to about 105° C., about 80° C. to about 97° C., about 90° C. to about 103° C., or about 93° C. to about 110° C. In another example, the temperature of the feed in line 109 can exceed the ambient temperature the polymerization system 100 is operating in by at least 5° C., at least 10° C., at least 15° C., at least 20° C., at least 25° C., at least 30° C., at least 35° C., at least 40° C., at least 50° C., at least 55° C., at least 60° C., at least 65° C., at least 70° C., at least 75° C., or at least 80° C.

The temperature of the feed in line 109 can also be referenced with respect to a temperature of the fluidized bed 115 within the reactor 101. Depending on the particular polymer product being produced within the reactor 101, the temperature of the fluidized bed 115 can widely vary. For example, the temperature of the fluidized bed 115 can range from about −10° C. to about 140° C., about 50° C. to about 130° C., about 60° C. to about 120° C., about 70° C. to about 110° C., or about 70° C. to about 105° C. In some embodiments, the temperature of the feed in line 109 can be equal to or greater than a temperature that is not less than 50° C., not less than 45° C., not less than 40° C., not less than 35° C., not less than 30° C., not less than 25° C., not less than 20° C., not less than 15° C., not less than 10° C., not less than 5° C., or not less than 1° C. below the temperature of the fluidized bed 115. In another example, the temperature of the feed in line 109 can be within about 50° C., about 45° C., about 40° C., about 35° C., about 30° C., about 25° C., about 20° C., about 15° C., about 10° C., about 5° C., or about 1° C. of the temperature of the fluidized bed 115. In another example, the temperature of the feed in line 109 can be equal to or greater than the temperature of the fluidized bed 115. For example, the temperature of the feed in line 109 can exceed the temperature of the fluidized bed 115 by about 1° C. or more, about 3° C. or more, about 5° C. or more, about 7° C. or more, about 10° C. or more, about 13° C. or more, about 15° C. or more, about 17° C. or more, about 20° C. or more, about 25° C. or more, about 30° C. or more, or about 35° C. or more.

In addition to increasing the catalyst productivity, the heated feed in line 109 can also serve one or more additional functions. For example, the heated feed introduced via line 109 to the nozzle 103 can facilitate maintaining the catalyst injection area clean. Said another way, the heated feed via line 109 can prevent or reduce catalyst accumulation and/or fouling on or about the nozzle 103. The heated feed introduced via line 109 to the nozzle 103 can also help to convey, transport, direct, inject, disperse, distribute, or otherwise introduce the catalyst via the first flow path 107 into the fluidized bed 115 in such a way that polymer agglomerates in the reactor 101 are reduced or eliminated.

The feed in lines 123, 109 can be or include one or more olefin monomers including, but not limited to, substituted and unsubstituted alkenes having two to 12 carbon atoms, such as ethylene, propylene, 1-butene, 1-pentene, 1-hexene, 1-heptene, 1-octene, 4-methylpent-1-ene, 1-decene, 1-dodecene, 1-hexadecene, and the like. The feed in lines 123, 109 can also include non-hydrocarbon gas(es) such as nitrogen, argon, helium, and/or hydrogen. The feed in lines 123, 109 can also be or include one or more inert compounds such as one or more induced condensing agents or ICAs. ICAs can include, but are not limited to, alkanes that may be condensable in the polymerization process for removing the heat of reaction. Illustrative ICAs can include, but are not limited to, propane, butane, isobutane, pentane, isopentane, hexane, isohexane, or any combination thereof.

The feed in lines 123, 109 can have a total monomer concentration of at least 50 mol %, at least 60 mol %, at least 70 mol %, at least 80 mol %, at least 90 mol %, at least 95 mol %, at least 96 mol %, at least 97 mol %, at least 98 mol %, at least 99 mol %, at least 99.9 mol %, or at least 99.99 mol %. For example, the feed in lines 123, 109 may have an ethylene concentration of at least 50 mol %, at least 60 mol %, at least 70 mol %, at least 80 mol %, at least 90 mol %, at least 95 mol %, at least 96 mol %, at least 97 mol %, at least 98 mol %, at least 99 mol %, at least 99.9 mol %, or at least 99.99 mol %.

The feed in lines 123, 109 can have an inert gas concentration, e.g., nitrogen, argon, helium, or any combination thereof of at least 50 mol %, at least 60 mol %, at least 70 mol %, at least 80 mol %, at least 90 mol %, at least 95 mol %, at least 96 mol %, at least 97 mol %, at least 98 mol %, at least 99 mol %, at least 99.9 mol %, or at least 99.99 mol %.

The feed in lines 123, 109 can have an ICA concentration of at least 50 mol %, at least 60 mol %, at least 70 mol %, at least 80 mol %, at least 90 mol %, at least 95 mol %, at least 96 mol %, at least 97 mol %, at least 98 mol %, at least 99 mol %, at least 99.9 mol %, or at least 99.99 mol %.

The feed in lines 123, 109 can have a combined monomer and inert gas concentration of at least 50 mol %, at least 60 mol %, at least 70 mol %, at least 80 mol %, at least 90 mol %, at least 95 mol %, at least 97 mol %, at least 98 mol %, at least 99 mol %, at least 99.9 mol %, or at least 99.99 mol %.

The feed via line 109 can be introduced to the nozzle 103 at a rate ranging from a low of about 100 kg/hr, about 450 kg/hr, about 800 kg/hr, about 1,000 kg/hr, or about 1,200 kg/hr to a high of about 1,350 kg/hr, about 1,500 kg/hr, about 1,800 kg/hr, about 2,000 kg/hr, about 2,200 kg/hr, about 2,500 kg/hr, about 2,700 kg/hr, or about 3,000 kg/hr, with suitable ranges comprising the combination of any two values.

The amount of the feed via line 109 introduced to the nozzle 103 can be less than about 40 wt %, less than about 30 wt %, less than about 25 wt %, less than about 20 wt %, less than about 15 wt %, less than about 10 wt %, less than about 7 wt %, less than about 5 wt %, or less than about 2 wt %, based on the amount of the one or more monomers consumed in the reactor 101. For example, the amount of the feed via line 109 introduced to the nozzle 103 can be from a low of about 0.01 wt %, about 0.1 wt %, about 1 wt %, about 2 wt %, about 5 wt %, about 10 wt %, about 12 wt %, about 15 wt %, or about 17 wt % to a high of about 20 wt %, about 23 wt %, about 25 wt %, about 27 wt %, or about 30 wt %, based on the amount of the one or more monomers consumed in the reactor 101, with suitable ranges comprising the combination of any two values. In another example, the amount of the feed introduced via line 109 to the nozzle 103 can be from about 0.1 wt % to about 3 wt %, about 1 wt % to about 3 wt %, about 1.5 wt % to about 2.5 wt %, about 2 wt % to about 4 wt %, about 3 wt % to about 8 wt %, about 5 wt % to about 15 wt %, about 10 wt % to about 30 wt %, about 15 wt % to about 25 wt %, about 18 wt % to about 26 wt %, about 19 wt % to about 22 wt %, or about 13 wt % to about 27 wt %, based on the amount of the one or more monomers consumed in the reactor 101. The amount of the feed via line 109 introduced to the nozzle 103 can be less than about 40 wt %, less than about 30 wt %, less than about 25 wt %, less than about 20 wt %, less than about 15 wt %, less than about 10 wt %, less than about 7 wt %, less than about 5 wt %, or less than about 2 wt %, based on the amount of any olefins consumed in the reactor 101. The amount of olefins can include olefins introduced via line 137, the recycle line 140, and/or the feed in line 109. In another example, the amount of the feed introduced via line 109 to the nozzle 103 can be from about 0.1 wt % to about 3 wt %, about 1 wt % to about 3 wt %, about 1.5 wt % to about 2.5 wt %, about 2 wt % to about 4 wt %, about 3 wt % to about 8 wt %, about 5 wt % to about 15 wt %, about 10 wt % to about 30 wt %, about 15 wt % to about 25 wt %, about 18 wt % to about 26 wt %, about 19 wt % to about 22 wt %, or about 13 wt % to about 27 wt %, based on the amount of any olefins consumed in the reactor 101. In some embodiments, the amount of the feed via line 109 introduced to the nozzle 103 can be greater than the amount of the one or more monomers consumed in the reactor 101, e.g., during reactor start-up, idle conditions, and/or shut-down.

As shown in FIG. 1, the feed introduced via line 109 and the catalyst introduced via line 105 to the nozzle 103 can each flow through the nozzle 103 without mixing or otherwise contacting one another within the nozzle 103, but instead can mix with one another within the fluidized bed 115. For example, upon exiting the nozzle 103 the catalyst and the feed can be mixed, blended, combined, or otherwise contacted with one another within the fluidized bed 115. In addition to contacting one another, upon exiting the nozzle 103 the catalyst and the feed can be mixed, blended, combined, or otherwise contacted with one or more monomers, catalyst particles, polymer particles, inert gases, and/or inert liquids that can make-up or form the fluidized bed 115. Although not shown, another suitable nozzle design can mix, blend, combine, or otherwise contact the feed introduced via line 109 to the nozzle 103 and the catalyst introduced via line 105 to the nozzle 103 within the nozzle 103. Also not shown, another suitable nozzle design can mix, blend, combine, or otherwise contact the feed in line 109 and the catalyst in line 105 prior to introduction to the nozzle 103 to form a feed and catalyst mixture and the mixture can be introduced to the nozzle 103. Illustrative nozzles can be similar to those discussed and described in U.S. Pat. Nos. 5,693,727; 5,962,606; 6,075,101; 6,211,310; 6,489,408; 6,500,905; and 7,989,562; U.S. Patent Application Publication Nos.: 20100298493 and 20100041841; and WO Publication Nos.: WO/2002/038629A2; WO/2008/042177A1; WO/2008/042078A1; and WO/2008/042182A1.

The heat exchanger 125 can be or include any apparatus or system capable of increasing the temperature of the feed in line 123 to a temperature greater than ambient temperature. The heat exchanger 125 can indirectly transfer heat from a heat transfer medium to the feed in line 123. Illustrative heat exchangers 125 can be or include one or more shell-and-tube, plate and frame, plate and fin, spiral wound, coil wound, U-tube, water tower, fans, fired, e.g., gas fired, and/or bayonet style heat exchangers. In one or more embodiments, the one or more heat exchangers can also include surface enhanced structures (e.g., fins, static mixers, rifling, heat conductive packing, turbulence causing projections, or any combination thereof), and the like.

The temperature of the catalyst in line 105 may be from a low of about −10° C., about 0° C., about 10° C., about 15° C., or about 20° C. to a high of about 30° C., about 40° C., about 50° C., about 60° C., about 70° C., about 80° C., about 90° C., or about 100° C. when introduced to the nozzle 103, with any suitable range comprising the combination of any two values. For example, the temperature of the catalyst in line 105 can be from about 15° C. to about 40° C., about 10° C. to about 25° C., about 20° C. to about 30° C., about 15° C. to about 35° C., about 20° C. to about 45° C., or about 5° C. to about 40° C. In another example, the catalyst in line 105 can be at the ambient temperature the polymerization system 100 is operating at. In another example, the catalyst in line 105 can be at a temperature within about 1° C., about 3° C., about 5° C., about 7° C., about 10° C., about 12° C., about 15° C., about 17° C., or about 20° C. of the ambient temperature.

The catalyst in line 105 can be or include any catalyst or combination of catalysts. Illustrative catalysts can include, but are not limited to, Ziegler-Natta catalysts, chromium-based catalysts, metallocene catalysts and other catalytic compounds containing uniform polymerization sites single-site catalysts including Group 15-containing catalysts, bimetallic catalysts, and mixed catalysts. The catalyst can also include $AlCl_3$, cobalt, iron, palladium, chromium/chromium oxide or "Phillips" catalysts. Any catalyst can be used alone or in combination with any other catalyst.

Illustrative Ziegler-Natta catalysts are disclosed European Patent Nos. EP 0103120; EP 1102503; EP 0231102; EP 0703246; U.S. Pat. Nos. RE 33,683; 4,115,639; 4,077,904; 4,302,565; 4,302,566; 4,482,687; 4,564,605; 4,721,763; 4,879,359; 4,960,741; 5,518,973; 5,525,678; 5,288,933; 5,290,745; 5,093,415; and 6,562,905; and U.S. Patent Application Publication No. 2008/0194780. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Suitable chromium catalysts can include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like. Other non-limiting examples of chromium catalysts can be as discussed and described in U.S. Pat. No. 6,989,344.

The catalyst system may comprise a metallocene catalyst component. Metallocene catalysts are generally described in, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and for use in the synthesis of polyethylene in 1 METALLOCENE-BASED POLYOLEFINS 261-377 (2000). Metallocene catalysts can include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom.

The Cp ligands are one or more rings or ring system(s), at least a portion of which includes π-bonded systems, such as cycloalkadienyl ligands and heterocyclic analogues. The ring(s) or ring system(s) typically comprise atoms selected from Groups 13 to 16 atoms, and, in some embodiments, the atoms that make up the Cp ligands are selected from carbon, nitrogen, oxygen, silicon, sulfur, phosphorous, germanium, boron, aluminum, and combinations thereof, where carbon makes up at least 50% of the ring members. For example, the Cp ligand(s) may be selected from substituted and unsubstituted cyclopentadienyl ligands and ligands isolobal to cyclopentadienyl. Non-limiting examples of such ligands include cyclopentadienyl, cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The metal atom "M" of the metallocene compound may be selected from Groups 3 through 12 atoms and lanthanide Group atoms; or may be selected from Groups 3 through 10 atoms; or may be selected from Sc, Ti, Zr, Hf, V, Nb, Ta, Mn, Re, Fe, Ru, Os, Co, Rh, Ir, and Ni; or may be selected from Groups 4, 5, and 6 atoms; or may be Ti, Zr, or Hf atoms; or may be Hf; or may be Zr. The oxidation state of the metal atom "M" can range from 0 to +7; or may be +1, +2, +3, +4 or +5; or may be +2, +3 or +4. The groups bound to the metal atom "M" are such that the compounds described below in the structures and structures are electrically neutral, unless otherwise indicated. The Cp ligand(s) forms at least one chemical bond with the metal atom M to form the "metallocene catalyst component." The Cp ligands are distinct from the leaving groups bound to metal atom M in that they are not highly susceptible to substitution/abstraction reactions.

The metallocene catalyst component may include compounds represented by Structure (I):

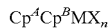  (I)

where M is as described above; each X is chemically bonded to M; each Cp group is chemically bonded to M; and n is 0 or an integer from 1 to 4. In some embodiments, n is either 1 or 2.

The ligands represented by $Cp^A$ and $Cp^B$ in Structure (I) may be the same or different cyclopentadienyl ligands or ligands isolobal to cyclopentadienyl, either or both of which may contain heteroatoms and either or both of which may be substituted by a group R. For example, $Cp^A$ and $Cp^B$ may be independently selected from cyclopentadienyl, indenyl, tetrahydroindenyl, fluorenyl, and substituted derivatives of each.

Independently, each $Cp^A$ and $Cp^B$ of Structure (I) may be unsubstituted or substituted with any one or combination of substituent groups R. Non-limiting examples of substituent groups R as used in Structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyl thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with Structure (I) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins, such as, but not limited to, olefinically unsaturated substituents including vinyl-terminated ligands, for example 3-butenyl, 2-propenyl, 5-hexenyl, and the like. In some embodiments, at least two R groups, for example, two adjacent R groups, are joined to form a ring structure having from 3 to 30 atoms selected from carbon, nitrogen, oxygen, phosphorous, silicon, germanium, aluminum, boron and combinations thereof. Also, a substituent R group, such as 1-butanyl, may form a bonding association to the element M.

Each X in Structure (I), above, and Structures (II)-(Va-d), below, is independently selected from: for example, halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, X is a $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, or $C_1$ to $C_{12}$ heteroatom-containing hydrocarbons, and substituted derivatives thereof. X may be selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, or $C_7$ to $C_{18}$ fluoroalkylaryls; or X may be selected from hydride, chloride, fluoride, methyl, phenyl, phenoxy, benzoxy, tosyl, fluoromethyls, and fluorophenyls; or X may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls; or X may be selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or X may be selected from fluoride, methyl, ethyl, propyl, phenyl, methylphenyl, dimethylphenyl, trimethylphenyl, fluoromethyls (mono-, di- and trifluoromethyls), and fluorophenyls (mono-, di-, tri-, tetra- and pentafluorophenyls). In some embodiments, at least one X is a halogenated aryloxy group or a derivative thereof. For example, at least one X may be a pentafluorophenoxy group.

The metallocene catalyst component may include those metallocenes of Structure (I) where $Cp^A$ and $Cp^B$ are bridged to each other by at least one bridging group, (A), such that the structure is represented by Structure (II):

$$Cp^A(A)Cp^B MX_n \qquad (II)$$

These bridged compounds represented by Structure (II) are known as "bridged metallocenes." $Cp^A$, $Cp^B$, M, X and n in Structure (II) are as defined above for Structure (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, and divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for Structure (I) including halogen radicals and iron. More particular non-limiting examples of bridging group (A) are represented by $C_1$ to $C_6$ alkylenes, substituted $C_1$ to $C_6$ alkylenes, oxygen, sulfur, R'$_2$C=, R'$_2$Si=, —Si(R')$_2$Si(R'$_2$)—, R'$_2$Ge=, R'P= (wherein "=" represents two chemical bonds), where R' is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In some embodiments, the bridged metallocene catalyst component of Structure (II) has two or more bridging groups (A).

Other non-limiting examples of bridging group (A), in Structure (II), include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In some embodiments, bridging group (A), in Structure (II), may also be cyclic, comprising, 4 to 10 ring members or 5 to 7 ring members. The ring members may be selected from the elements mentioned above, or from one or more of B, C, Si, Ge, N and O. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination thereof.

The cyclic bridging groups (A) may be saturated or unsaturated and/or carry one or more substituents and/or be fused to one or more other ring structures. If present, the one or more substituents may be a hydrocarbyl (e.g., alkyl such as methyl) or halogen (e.g., F, Cl). The one or more Cp groups which the above cyclic bridging moieties may optionally be fused to may be saturated or unsaturated and are selected from those having 4 to 10, more particularly 5, 6, or 7 ring members (selected from C, N, O and S in a particular embodiment), such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

In some embodiments, the ligands $Cp^A$ and $Cp^B$ of Structures (I) and (II) may be different from each other, or in other embodiments may be the same as each other.

The metallocene catalyst component may include mono-ligand metallocene compounds, such as, monocyclopentadienyl catalyst components, as described in WO 93/08221.

The metallocene catalyst component may be an unbridged "half sandwich" metallocene represented by Structure (III):

where $Cp^A$ is defined as for the Cp groups in Structure (I) and is a ligand that is bonded to M; each Q is independently bonded to M; Q is also bound to $Cp^A$ in one embodiment; X is a leaving group as described above in Structure (I); n ranges from 0 to 3, or is 1 or 2; q ranges from 0 to 3, or is 1 or 2.

$Cp^A$ may be selected from cyclopentadienyl, indenyl, tetrahydroindenyl, fluorenyl, substituted version thereof, and combinations thereof. In Structure (III), Q may be selected from ROO⁻, RO—, R(O)—, —NR—, —CR$_2$—, —S—, —NR$_2$, —CR$_3$, —SR, —SiR$_3$, —PR$_2$, —H, and substituted and unsubstituted aryl groups, wherein R is selected from hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. R may be selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in Structure (IV), such as described in, for example, U.S. Pat. No. 6,069,213:

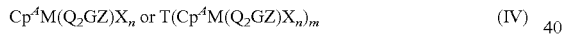

where M, $Cp^A$, X and n are as defined above; and $Q_2GZ$ forms a polydentate ligand unit (e.g., pivalate), where at least one of the Q groups form a bond with M, and is defined such that each Q is independently selected from —O—, —NR—, —CR$_2$— and —S—; G is either carbon or silicon; and Z is selected from R, —OR, —NR$_2$, —CR$_3$, —SR, —SiR$_3$, —PR$_2$, and hydride, providing that when Q is —NR—, then Z is selected from —OR, —NR$_2$, —SR, —SiR$_3$, —PR$_2$; and provided that neutral valency for Q is satisfied by Z; and where each R is independently selected from hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof, or each R may be selected from $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys; where T is a bridging group selected from $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; where each T group bridges adjacent "$Cp^A M(Q_2GZ)X_n$" groups, and is chemically bonded to the $Cp^A$ groups; and where m is an integer from 1 to 7 or m is an integer from 2 to 6.

The metallocene catalyst component can be described more particularly in Structures (Va-i), (Va-ii), (Vb), (Vc), (Vd), (V), and (Vf):

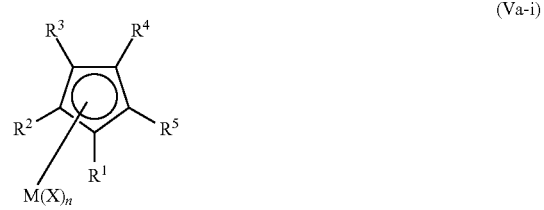

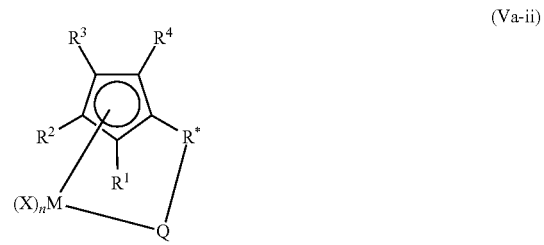

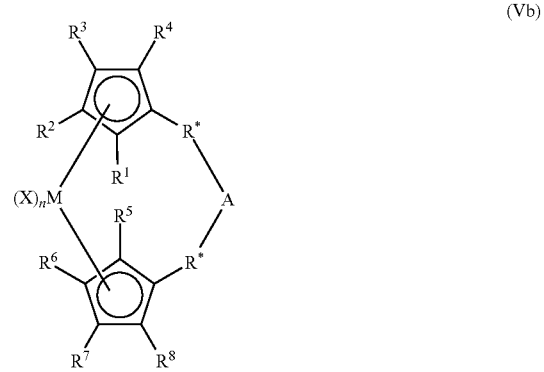

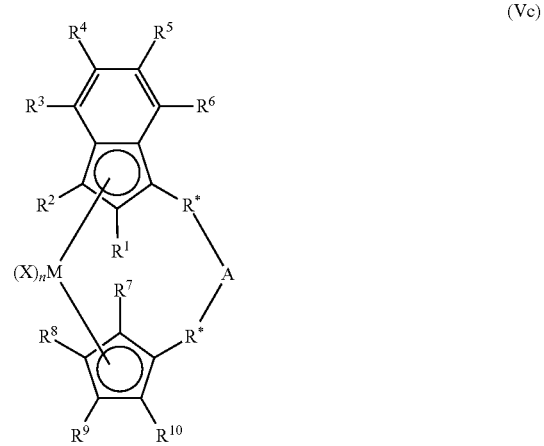

-continued

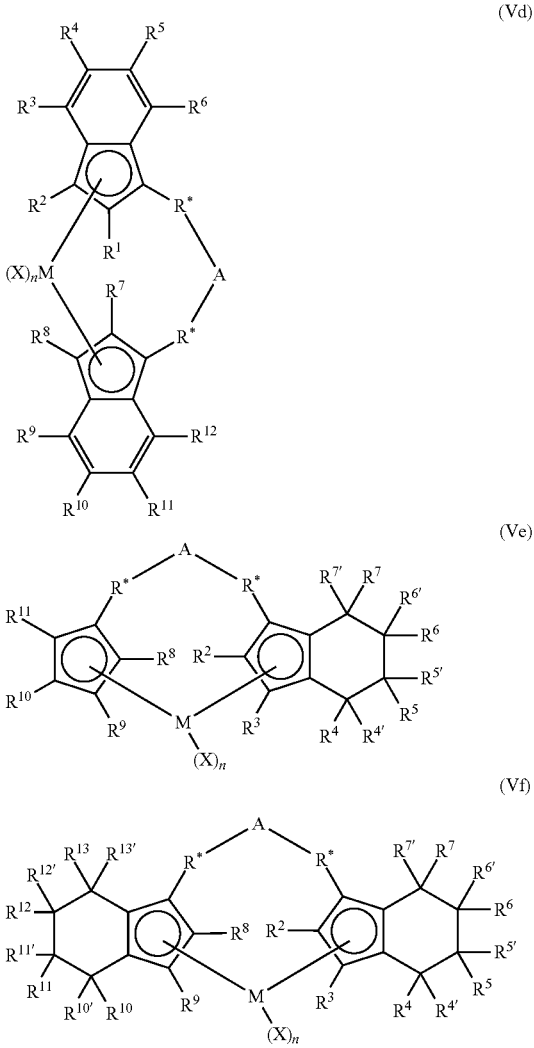

In Structures (Va-i) to (Vf), M may be selected from Group 3 to Group 12 atoms; or may be selected from Group 3 to Group 10; or may be selected from Group 3 to Group 6 atoms; or may be selected from Group 4 atoms; or may be selected from Zr or Hf; or may be Zr.

In Structures (Va-i) to (Vf), Q may be selected from hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, alkylenes, aryls, arylenes, alkoxys, aryloxys, amines, arylamines (e.g., pyridyl)alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q may comprise from 1 to 20 carbon atoms; and wherein the aromatic groups may comprise from 5 to 20 carbon atoms.

In Structures (Va-ii) to (Vf), each R* may be independently selected from the divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. In some embodiments, each R* may be independently selected from divalent hydrocarbylenes and heteroatom-containing hydrocarbylenes; or may be selected from alkylenes, substituted alkylenes, and heteroatom-containing hydrocarbylenes; or may be selected from $C_1$ to $C_{12}$ alkylenes, $C_1$ to $C_{12}$ substituted alkylenes, and $C_1$ to $C_{12}$ heteroatom-containing hydrocarbylenes; or may be selected from $C_1$ to $C_4$ alkylenes. In some embodiments of (Vb) to (Vf), both R* groups are the same.

In Structures (Va-i) to (Vf), A is as described above for (A) in Structure (II). In some embodiments, A may be selected from a chemical bond, O, S, $SO_2$, NR, $-SiR_2$, $=GeR_2$, $=SnR_2$, $-R_2SiSiR_2-$, RP=, $C_1$ to $C_{12}$ alkylenes, substituted $C_1$ to $C_{12}$ alkylenes, divalent $C_4$ to $C_{12}$ cyclic hydrocarbons, and substituted and unsubstituted aryl groups; or may be selected from $C_5$ to $C_8$ cyclic hydrocarbons, $-CH_2CH_2-$, $=CR_2$, and $=SiR_2$.

In Structures (Va-i) to (Vf), each R may be independently selected from alkyls, cycloalkyls, aryls, alkoxys, fluoroalkyls, and heteroatom-containing hydrocarbons; or may be selected from $C_1$ to $C_6$ alkyls, substituted phenyls, phenyl, and $C_1$ to $C_6$ alkoxys; or may be selected from methoxy, methyl, phenoxy, and phenyl. In some embodiments, A may be absent, in which case each R* is defined as for $R^1$-$R^{13}$; each X is as described above in (I); n is an integer from 0 to 4, and from 1 to 3 in another embodiment, and 1 or 2 in yet another embodiment; and $R^1$ through $R^{13}$ are independently selected from hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, and aroylaminos. $R^1$ through $R^{13}$ may also be selected independently from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons, and substituted derivatives thereof; or may be selected from hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, or $C_7$ to $C_{18}$ fluoroalkylaryls; or may be selected from hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups; wherein adjacent R groups may form a ring, either saturated, partially saturated, or completely saturated.

The structure of the metallocene catalyst component represented by Structures (Va-i) and (Va-ii) may take on many forms such as disclosed in, for example, U.S. Pat. No. 5,026,798, U.S. Pat. No. 5,703,187, and U.S. Pat. No. 5,747,406, including a dimeric or oligomeric structure, such as disclosed in, for example, U.S. Pat. No. 5,026,798 and U.S. Pat. No. 6,069,213.

In a particular embodiment of the metallocene represented in Structure (Vd), $R^1$ and $R^2$ form a conjugated 6-membered carbon ring system that may or may not be substituted.

It is contemplated that the metallocene catalysts components described above include their structural or optical or enantiomeric isomers (racemic mixture), and may be a pure enantiomer in one embodiment. As used herein, a single, bridged, asymmetrically substituted metallocene catalyst component having a racemic and/or meso isomer does not, itself, constitute at least two different bridged, metallocene catalyst components. The "metallocene catalyst compound", also referred to herein as the metallocene catalyst component" may comprise any combination of any "embodiment" described herein.

Other suitable metallocenes include but are not limited to the metallocenes described in the U.S. patents cited above, as well as those described in U.S. Pat. Nos. 7,179,876, 7,169,864, 7,157,531, 7,129,302, 6,995,109, 6,958,306, 6,884,748, 6,689,847, U.S. Pat. App. Pub. No. 2007/0055028, and published PCT App. Nos. WO 97/22635, WO 00/69922, WO 01/30860, WO 01/30861, WO 02/46246, WO 02/50088, WO 04/026921, and WO 06/019494. Additional catalysts suitable for use herein include those described in U.S. Pat. Nos. 6,309,997, 6,265,338, U.S. Pat. App. Pub. No. 2006/019925, and the following articles: Chem Rev 2000, 100, 1253, Resconi; Chem Rev 2003, 103, 283; Chem Eur. J. 2006, 12, 7546 Mitsui; J Mol Catal A 2004, 213, 141; Macromol Chem Phys 2005, 206, 1847; and J Am Chem Soc 2001, 123, 6847.

The "Group 15-containing catalyst" may include Group 3 to Group 12 metal complexes, wherein the metal is 2 to 8 coordinate, the coordinating moiety or moieties including at least two Group 15 atoms, and up to four Group 15 atoms. For example, the Group 15-containing catalyst component can be a complex of a Group 4 metal and from one to four ligands such that the Group 4 metal is at least 2 coordinate, the coordinating moiety or moieties including at least two nitrogens. Representative Group 15-containing compounds are disclosed in WO Publication No. WO 99/01460; European Publication Nos. EP0893454A1; EP 0894005A1; U.S. Pat. Nos. 5,318,935; 5,889,128; 6,333,389; and 6,271,325.

The Group 15-containing catalyst components may include Group 4 imino-phenol complexes, Group 4 bis(amide) complexes, and Group 4 pyridyl-amide complexes that are active towards olefin polymerization to any extent.

The Group 15-containing catalyst component may be more particularly described by the Structure (VI):

$$\alpha_a\beta_b\gamma_g MX_n \qquad (VI)$$

where β and γ are groups that each comprise at least one Group 14 to Group 16 atom; and β (when present) and γ are groups bonded to M through between 2 and 6 Group 14 to Group 16 atoms, at least two atoms being Group 15-containing atoms. More particularly, β and γ are groups selected from Group 14 and Group 15-containing alkyls, aryls, alkylaryls, and heterocyclic hydrocarbons, and chemically bonded combinations thereof; or are selected from Group 14 and Group 15-containing: $C_1$ to $C_{10}$ alkyls, $C_6$ to $C_{12}$ aryls, $C_6$ to $C_{18}$ alkylaryls, and $C_4$ to $C_{12}$ heterocyclic hydrocarbons, and chemically bonded combinations thereof; or are selected from $C_1$ to $C_{10}$ alkylamines, $C_1$ to $C_{10}$ alkoxys, $C_6$ to $C_{20}$ alkylarylamines, $C_6$ to $C_{18}$ alkylaryloxys, and $C_4$ to $C_{12}$ nitrogen containing heterocyclic hydrocarbons, and $C_4$ to $C_{12}$ alkyl substituted nitrogen containing heterocyclic hydrocarbons, and chemically bonded combinations thereof; or are selected from anilinyls, pyridyls, quinolyls, pyrrolyls, pyrimidyls, purinyls, imidazyls, indolyls, $C_1$ to $C_6$ alkyl substituted groups selected from anilinyls, pyridyls, quinolyls, pyrrolyls, pyrimidyls, purinyls, imidazyls, indolyls; $C_1$ to $C_6$ alkylamine substituted groups selected from anilinyls, pyridyls, quinolyls, pyrrolyls, pyrimidyls, purinyls, imidazyls, indolyls, amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, and chemically bonded combinations thereof.

In Structure (VI), α is a linking (or "bridging") moiety that, when present, forms a chemical bond to each of β and γ, or two γ's, thus forming a "γαγ" or "γαβ" ligand bound to M; α may also comprise a Group 14 to Group 16 atom which may be bonded to M through the Group 14 to Group 16 atom. More particularly, α is a divalent bridging group selected from divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers, alkylenes, arylenes, alkenylenes, heterocyclic arylenes, alkylarylenes, heteroatom containing alkylenes, heteroatom containing alkenylenes, and heterocyclic hydrocarbonylenes; or α may be selected from $C_1$ to $C_{10}$ alkylenes, $C_2$ to $C_{140}$ alkenylenes, $C_6$ to $C_{12}$ arylenes, $C_1$ to $C_{10}$ divalent ethers, $C_6$ to $C_{12}$ O- or N-containing arylenes, $C_2$ to $C_{10}$ alkyleneamines, $C_6$ to $C_{12}$ aryleneamines, and substituted derivatives thereof.

In Structure (VI), a is an integer from 0 to 2; or a is either 0 or 1; or a is 1; b is an integer from 0 to 2; and g is an integer from 1 to 2. In some embodiments, a is 1, b is 0, and g is 2. M may be selected from Group 3 to Group 12 atoms; or selected from Group 3 to Group 10 atoms; or selected from Group 3 to Group 6 atoms; or selected from Ni, Cr, Ti, Zr, and Hf; or selected from Zr and Hf. Each X is as defined above. n is an integer from 0 to 4; or is an integer from 1 to 3; or is 2 or 3.

As used herein, "chemically bonded combinations thereof" means that adjacent groups, (e.g., β and γ groups) may form a chemical bond between them; for example, the β and γ groups are chemically bonded through one or more α groups there between.

As used herein, the terms "alkyleneamines", "aryleneamines", describe alkylamines and arylamines (respectively) that are deficient by two hydrogens, thus forming chemical bonds with two adjacent γ groups, or adjacent β and γ groups. Thus, an example of an alkyleneamine is —CH$_2$CH$_2$N(CH$_3$)CH$_2$CH$_2$—, and an example of a heterocyclic hydrocarbylene or aryleneamine is —C$_5$H$_3$N— (divalent pyridine). An "alkylene-arylamine" is a group such as, for example, —CH$_2$CH$_2$(C$_5$H$_3$N)CH$_2$CH$_2$—.

Described another way, the Group 15-containing catalyst component is represented by Structures (VII) and (VIII):

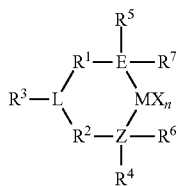

(VII)

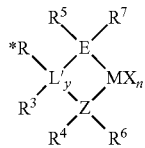

(VIII)

wherein E and Z are Group 15 elements independently selected from nitrogen and phosphorus in one embodiment; and nitrogen in a more particular embodiment, L and L' may or may not form a bond with M; y is an integer ranging from 0 to 2 (when y is 0, group L', *R and R$^3$ are absent); M is selected from Group 3 to Group 5 atoms, or Group 4 atoms, or selected from Zr and Hf; n is an integer ranging from 1 to 4, or from 2 to 3; and each X is as defined above.

In Structure (VII), L may be selected from Group 15 atoms, Group 16 atoms, Group 15-containing hydrocarbylenes, and a Group 16-containing hydrocarbylenes; wherein R$^3$ is absent when L is a Group 16 atom. In some embodiments, when R$^3$ is absent, L is selected from heterocyclic hydrocarbylenes; or L is selected from nitrogen, phosphorous, anilinyls, pyridyls, quinolyls, pyrrolyls, pyrimidyls, purinyls, imidazyls, indolyls; C$_1$ to C$_6$ alkyl substituted groups selected from anilinyls, pyridyls, quinolyls, pyrrolyls, pyrimidyls, purinyls, imidazyls, and indolyls; C$_1$ to C$_6$ alkylamine substituted groups selected from anilinyls, pyridyls, quinolyls, pyrrolyls, pyrimidyls, purinyls, imidazyls, indolyls; amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, substituted derivatives thereof, and chemically bonded combinations thereof.

In Structure (VIII), L' is selected from Group 15 atoms, Group 16 atoms, and Group 14 atoms in one embodiment; and selected from Group 15 and Group 16 atoms in a more particular embodiment; and is selected from groups as defined by L above in yet a more particular embodiment, wherein "EZL" and "EZL'" may be referred to as a "ligand", the EZL and EZL' ligands comprising the R* and R$^1$-R$^7$ groups;

In Structure (VII), R$^1$ and R$^2$ are independently: divalent bridging groups selected from alkylenes, arylenes, heteroatom containing alkylenes, heteroatom containing arylenes, substituted alkylenes, substituted arylenes and substituted heteroatom containing alkylenes, wherein the heteroatom is selected from silicon, oxygen, nitrogen, germanium, phosphorous, boron and sulfur; or is selected from C$_1$ to C$_{20}$ alkylenes, C$_6$ to C$_{12}$ arylenes, heteroatom-containing C$_1$ to C$_{20}$ alkylenes, and heteroatom-containing C$_6$ to C$_{12}$ arylenes; or is selected from —CH$_2$—, —C(CH$_3$)$_2$—, —C(C$_6$H$_5$)$_2$—, —CH$_2$CH$_2$—, —CH$_2$CH$_2$CH$_2$—, —Si(CH$_3$)$_2$—, —Si(C$_6$H$_5$)$_2$—, —C$_6$H$_{10}$—, —C$_6$H$_4$—, and substituted derivatives thereof, the substitutions including C$_1$ to C$_4$ alkyls, phenyl, and halogen radicals.

In Structure (VIII), R$^3$ may be absent; or may be a group selected from hydrocarbyl groups, hydrogen radical, halogen radicals, and heteroatom-containing groups; or may be selected from linear alkyls, cyclic alkyls, and branched alkyls having 1 to 20 carbon atoms.

In Structure (VIII), *R may be absent; or may be a group selected from hydrogen radical, Group 14 atom containing groups, halogen radicals, and heteroatom-containing groups.

In Structures (VII) and (VIII), R$^4$ and R$^5$ are independently: groups selected from alkyls, aryls, substituted aryls, cyclic alkyls, substituted cyclic alkyls, cyclic arylalkyls, substituted cyclic arylalkyls, and multiple ring systems, wherein each group has up to 20 carbon atoms, or between 3 and 10 carbon atoms; or is selected from C$_1$ to C$_{20}$ alkyls, C$_1$ to C$_{20}$ aryls, C$_1$ to C$_{20}$ arylalkyls, and heteroatom-containing groups (for example PR$_3$, where R is an alkyl group).

In Structures (VII) and (VIII), R$^6$ and R$^7$ are independently: absent; or are groups selected from hydrogen radicals, halogen radicals, heteroatom-containing groups and hydrocarbyls; or are selected from linear, cyclic and branched alkyls having from 1 to 20 carbon atoms; wherein R$^1$ and R$^2$ may be associated with one another, and/or R$^4$ and R$^5$ may be associated with one another as through a chemical bond.

Described yet more particularly, the Group 15-containing catalyst component can be described as the embodiments shown in Structures (IX), (X) and (XI) (where "N" is nitrogen):

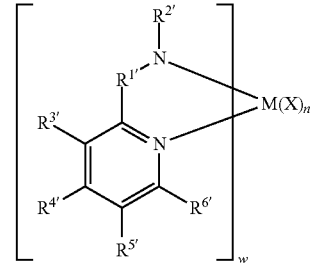

(IX)

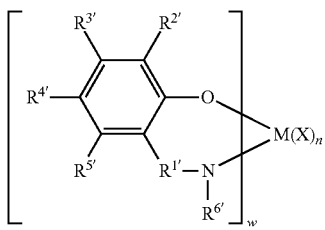

(X)

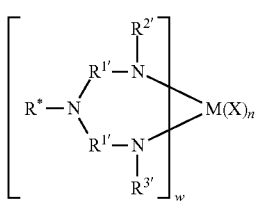

(XI)

wherein Structure (IX) represents pyridyl-amide structures, Structure (X) represents imino-phenol structures, and Structure (XI) represents bis(amide) structures. In these Structures, w is an integer from 1 to 3, or is 1 or 2, or is 1 in some embodiments. M is a Group 3 to Group 13 element, or a Group 3 to Group 6 element, or Group 4 element in some embodiments. Each X is independently selected from hydrogen radicals, halogen ions (desirably, anions of fluorine, chlorine, and bromine); $C_1$ to $C_6$ alkyls; $C_1$ to $C_6$ fluoroalkyls, $C_6$ to $C_{12}$ aryls; $C_6$ to $C_{12}$ fluoroalkyls, $C_1$ to $C_6$ alkoxys, $C_6$ to $C_{12}$ aryloxys, and $C_7$ to $C_{18}$ alkylaryloxys. n is an integer ranging from 0 to 4, or from 1 to 3, or from 2 to 3, or is 2 in some embodiments.

Further, in Structures (IX), (X), and (XI), $R^{1\prime}$ may be selected from hydrocarbylenes and heteroatom-containing hydrocarbylenes, or may be selected from —$SiR_2$—, alkylenes, arylenes, alkenylenes and substituted alkylenes, substituted alkenylenes and substituted arylenes; or may be selected from —$SiR_2$—, $C_1$ to $C_6$ alkylenes, $C_6$ to $C_{12}$ arylenes, $C_1$ to $C_6$ substituted alkylenes and $C_6$ to $C_{12}$ substituted arylenes, wherein R is selected from $C_1$ to $C_6$ alkyls and $C_6$ to $C_{12}$ aryls.

Further, in Structures (IX), (X), and (XI), $R^{1\prime}$ $R^{2\prime}$, $R^{3\prime}$, $R^{4\prime}$, $R^{5\prime}$, $R^{6\prime}$ and R* are independently selected from hydride, $C_1$ to $C_{10}$ alkyls, $C_6$ to $C_{12}$ aryls, $C_6$ to $C_{18}$ alkylaryls, $C_4$ to $C_{12}$ heterocyclic hydrocarbyls, substituted $C_1$ to $C_{10}$ alkyls, substituted $C_6$ to $C_{12}$ aryls, substituted $C_6$ to $C_{18}$ alkylaryls, and substituted $C_4$ to $C_{12}$ heterocyclic hydrocarbyls and chemically bonded combinations thereof. In some embodiments, R* is absent. In some embodiments, R*—N represents a nitrogen containing group or ring such as a pyridyl group or a substituted pyridyl group that is bridged by the $R^{1\prime}$ groups. In some embodiments, R*—N is absent, and the $R^{1\prime}$ groups form a chemical bond to one another.

In some embodiments of Structures (IX), (X), and (XI), $R^{1\prime}$ is selected from methylene, ethylene, 1-propylene, 2-propylene, =$Si(CH_3)_2$, =$Si(phenyl)_2$, —CH=, —$C(CH_3)$=, —$C(phenyl)_2$-, —C(phenyl)=(wherein "=" represents two chemical bonds), and the like.

In a particular embodiment of Structure (X), $R^{2\prime}$ and $R^{4\prime}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 2-methyl-4-chlorophenyl, 2-n-propyl-4-chlorophenyl, 2-iso-propyl-4-chlorophenyl, 2-iso-butyl-4-chlorophenyl, 2-tert-butyl-4-chlorophenyl, 2-methyl-4-fluorophenyl, 2-n-propyl-4-fluorophenyl, 2-iso-propyl-4-fluorophenyl, 2-iso-butyl-4-fluorophenyl, 2-tert-butyl-4-fluorophenyl, 2-methyl-4-bromophenyl, 2-n-propyl-4-bromophenyl, 2-iso-propyl-4-bromophenyl, 2-iso-butyl-4-bromophenyl, 2-tert-butyl-4-bromophenyl, and the like.

In some embodiments of Structures (IX) and (XI), $R^{2\prime}$ and $R^{3\prime}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 4-methylphenyl, 4-n-propylphenyl, 4-iso-propylphenyl, 4-iso-butylphenyl, 4-tert-butylphenyl, 4-fluorophenyl, 4-chlorophenyl, 4-bromophenyl, 6-methylphenyl, 6-n-propylphenyl, 6-iso-propylphenyl, 6-iso-butylphenyl, 6-tert-butylphenyl, 6-fluorophenyl, 6-chlorophenyl, 6-bromophenyl, 2,6-dimethylphenyl, 2,6-di-n-propylphenyl, 2,6-di-iso-propylphenyl, 2,6-di-isobutylphenyl, 2,6-di-tert-butylphenyl, 2,6-difluorophenyl, 2,6-dichlorophenyl, 2,6-dibromophenyl, 2,4,6-trimethylphenyl, 2,4,6-tri-n-propylphenyl, 2,4,6-tri-iso-propylphenyl, 2,4,6-tri-iso-butylphenyl, 2,4,6-tri-tert-butylphenyl, 2,4,6-trifluorophenyl, 2,4,6-trichlorophenyl, 2,4,6-tribromophenyl, 2,3,4,5,6-pentafluorophenyl, 2,3,4,5,6-pentachlorophenyl, 2,3,4,5,6-pentabromophenyl, and the like.

In some embodiments of Structures (IX), (X), and (XI), X is independently selected from fluoride, chloride, bromide, methyl, ethyl, phenyl, benzyl, phenyloxy, benzloxy, 2-phenyl-2-propoxy, 1-phenyl-2-propoxy, 1-phenyl-2-butoxy, 2-phenyl-2-butoxy and the like.

Non-limiting examples of the Group 15-containing catalyst component are represented by Structures (XIIa)-(XIIf) (where "N" is nitrogen):

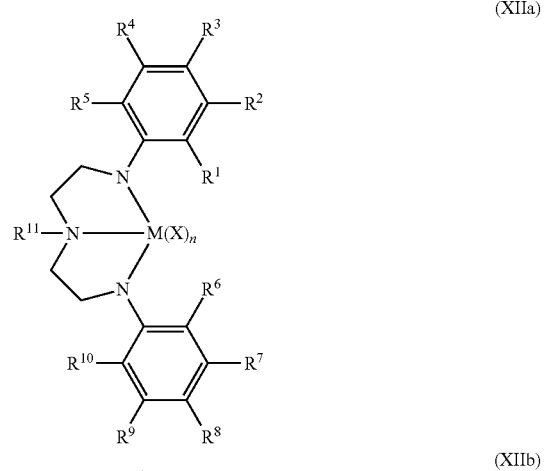

(XIIa)

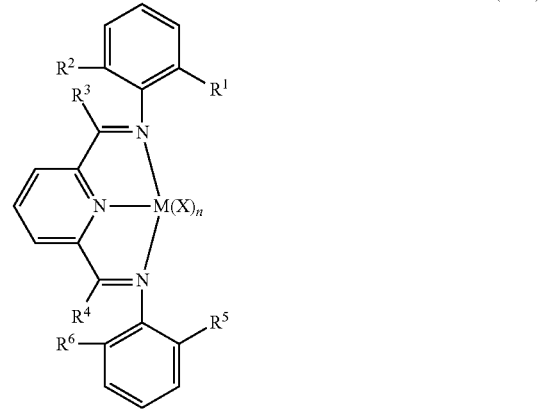

(XIIb)

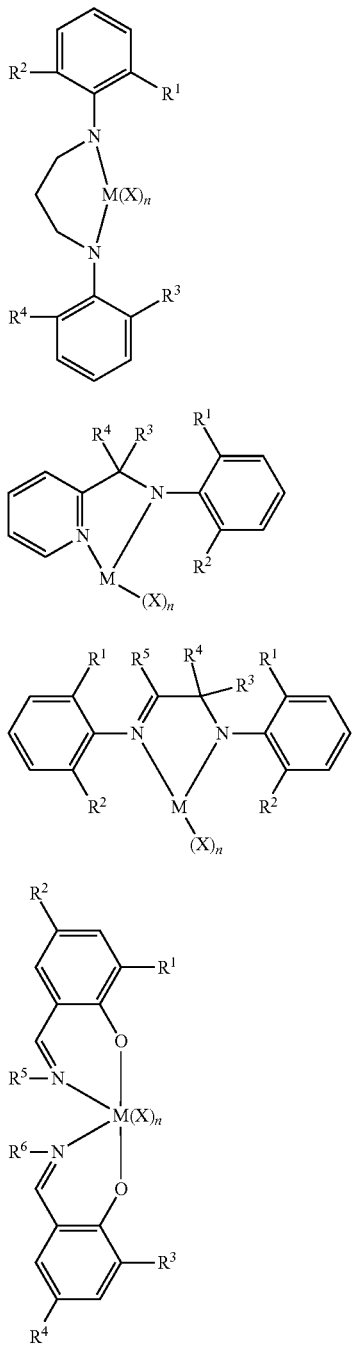

wherein in Structures (XIIa) through (XIIf), M is selected from Group 4 atoms or is selected from Zr and Hf; and wherein $R^1$ through $R^{11}$ in Structures (XIIa) through (XIIf) are selected from hydride, fluorine radical, chlorine radical, bromine radical, methyl, ethyl, n-propyl, isopropyl, n-butyl, isobutyl, tert-butyl and phenyl; and X is selected from fluorine ion, chlorine ion, bromine ion, methyl, phenyl, benzyl, phenyloxy and benzyloxy; and n is an integer ranging from 0 to 4, or from 2 to 3.

The Group 15-containing catalyst components may be prepared by methods known in the art, such as those disclosed in, for example, EP 0 893 454 A1, U.S. Pat. No. 5,889,128, U.S. Pat. No. 6,333,389 B2 and WO 00/37511.

Preferably the catalyst is a mixed catalyst which may comprise a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one example, the mixed catalyst includes at least one metallocene catalyst component and at least one non-metallocene component.

In some embodiments, the catalyst in line 105 can be or include a mixed catalyst that includes at least one metallocene component. In some embodiments, the catalyst in line 105 may be a mixed catalyst system that includes at least one metallocene component and at least one Group-15 containing component. The metallocene components and Group-15 containing components may be as described above. For example, the mixed catalyst may comprise [(2,4,6-Me$_3$C$_6$H$_2$)NCH$_2$CH$_2$]$_2$NHHfBz$_2$ or [(2,4,6-Me$_3$C$_6$H$_2$)NCH$_2$CH$_2$]$_2$NHZrBz$_2$ or [(2,3,4,5,6-Me$_5$C$_6$)NCH$_2$CH$_2$]$_2$NHZrBz$_2$, where Bz is a benzyl group, combined with bis(indenyl)zirconium dichloride, (pentamethylcyclopentadienyl)(n-propylcyclopentadienyl)zirconium dichloride, or (tetramethylcyclopentadienyl)(n-propylcyclopentadienyl) zirconium dichloride.

One example of mixed catalyst systems suitable for use herein are the PRODIGY™ Bimodal Catalysts available from Univation Technologies.

In some embodiments, an activator may be used with the catalyst compound. As used herein, the term "activator" refers to any compound or combination of compounds, supported or unsupported, which can activate a catalyst compound or component, such as by creating a cationic species of the catalyst component. Illustrative activators include, but are not limited to, aluminoxane (e.g., methylaluminoxane "MAO"), modified aluminoxane (e.g., modified methylaluminoxane "MMAO" and/or tetraisobutyldialuminoxane "TIBAO"), and alkylaluminum compounds, ionizing activators (neutral or ionic) such as tri(n-butyl)ammonium tetrakis (pentafluorophenyl)boron may be also be used, and combinations thereof. The molar ratio of metal in the activator to metal in the catalyst composition can range from 1000:0.1 to 0.5:1, 300:1 to 0.5:1, 150:1 to 1:1, 50:1 to 1:1, 10:1 to 0.5:1, or 3:1 to 0.3:1.

The catalyst compositions can include a support material or carrier. As used herein, the terms "support" and "carrier" are used interchangeably and refer to any support material, including a porous support material, for example, talc, inorganic oxides, and inorganic chlorides. The catalyst component(s) and/or activator(s) can be deposited on, contacted with, vaporized with, bonded to, or incorporated within, adsorbed or absorbed in, or on, one or more supports or carriers. Other support materials can include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Suitable catalyst supports are described in, for example, U.S. Pat. Nos. 4,701,432; 4,808,561; 4,912,075; 4,925,821; 4,937,217; 5,008,228; 5,238,892; 5,240,894; 5,332,706;

5,346,925; 5,422,325; 5,466,649; 5,466,766; 5,468,702; 5,529,965; 5,554,704; 5,629,253; 5,639,835; 5,625,015; 5,643,847; 5,665,665; 5,698,487; 5,714,424; 5,723,400; 5,723,402; 5,731,261; 5,759,940; 5,767,032; 5,770,664; and 5,972,510; and WO Publication Nos. WO 95/32995; WO 95/14044; WO 96/06187; WO 97/02297; WO 99/47598; WO 99/48605; and WO 99/50311.

The catalyst via line 105 can be introduced to the nozzle 103 at a flow rate from a low of about 0.001 kg/hr, about 0.005 kg/hr, about 0.02 kg/hr, 0.1 kg/hr, about 0.5 kg/hr, about 1 kg/hr, about 1.5 kg/hr, about 2 kg/hr, or about 3 kg/hr to a high of about 5 kg/hr, about 10 kg/hr, about 15 kg/hr, about 20 kg/hr, or about 25 kg/hr, with suitable ranges comprising the combination of any two values. For example, the catalyst via line 105 can be introduced to the nozzle 103 at a flow rate of about 0.4 kg/hr to about 23 kg/hr, about 1.4 kg/hr to about 14 kg/hr, or about 2.3 kg/hr to about 4.5 kg/hr. The catalyst in line 105 can be or include fully formed catalyst particles suspended in one or more inert liquids, e.g., in the form of a catalyst slurry or suspension. For example, the concentration of the catalyst particles in a catalyst slurry can range from a low of about 1 wt %, about 5 wt %, about 12 wt %, or about 15 wt % to a high of about 20 wt %, about 23 wt %, about 25 wt %, or about 30 wt %, with suitable ranges comprising the combination of any two values. The catalyst can be slurried in any suitable liquid or combination of liquids. Suitable liquids for forming the catalyst slurry can include, but are not limited to, toluene, ethylbenzene, xylene, pentane, hexane, heptane, octane, other hydrocarbons, or any combination thereof. One or more mineral oils or other non-reactive liquid hydrocarbons can also be used to form the catalyst slurry. The catalyst system in line 105 can be or include catalyst particles that are at least partially dissolved in one or more inert liquids. The catalyst in line 105 can be or include catalyst particles that are substantially, if not completely, dissolved in the one or more inert liquids. The catalyst system in line 105 can be in the form of a powder, e.g., a spray dried catalyst.

Referring again to the polymerization system 100, the reactor 101 can include a cylindrical section 130, a transition section 133, and the velocity reduction zone or dome 135. The cylindrical section 130 is disposed adjacent the transition section 133. The transition section 133 can expand from a first diameter that corresponds to the diameter of the cylindrical section 130 to a larger diameter adjacent the dome 135. The location or junction at which the cylindrical section 130 connects to the transition section 133 is referred to as the "neck" or the "reactor neck." The dome 135 may have a bulbous shape. One or more cycle fluid or recycle lines 140 can be in fluid communication with the top head 135.

In general, the height to diameter ratio of the cylindrical section 130 can vary in the range of from about 2:1 to about 5:1. The range can vary to larger or smaller ratios and depends, at least in part, upon the desired production capacity and/or reactor dimensions. The inner diameter of the cylindrical section 130 can be from a low of about 0.1 m, about 0.3 m, about 0.6 m, about 1 m, about 1.5 m, or about 2 m to a high of about 2.4 m, about 3 m, about 3.5 m, about 4 m, about 5 m, about 7 m, or about 9 m. For example, the diameter of the cylindrical section 130 can be about 0.5 m, about 1 m, about 2 m, about 2.4 m, about 3 m, about 4.4 m, about 5 m, or about 6 m. A height or length of the cylindrical section can be from a low of about 1 m, about 3 m, about 5, or about 10 m to a high of about 13 m, about 17 m, about 20 m, or about 23 m. For example, the length of the cylindrical section 130 can be about 8 m, about 11 m, about 15 m, or about 18 m. In at least one example, the cylindrical section 130 can have an inner diameter of about 1 m to about 3 m and a height or length of about 2 m to about 11 m, or an inner diameter of about 2.5 m to about 6 m and a height or length of about 5 m to about 18 m.

The cross-sectional area of the dome 135 is typically within the range of from about 2 to about 3 multiplied by the cross-sectional area of the cylindrical section 130. The velocity reduction zone or dome 135 has a larger inner diameter than the fluidized bed 115. As the name suggests, the velocity reduction zone 135 slows the velocity of the gas due to the increased cross-sectional area. This reduction in gas velocity allows particles entrained in the upward moving gas to fall back into the fluidized bed 115, allowing primarily only gas to exit overhead of the reactor 101 through the recycle line 140. The recycle fluid recovered via line 140 can contain less than about 10% wt, less than about 8% wt, less than about 5% wt, less than about 4% wt, less than about 3% wt, less than about 2% wt, less than about 1% wt, less than about 0.5% wt, or less than about 0.2% wt of the particles entrained in fluidized bed 115.

A reactor feed via line 137 can be introduced to the polymerization system 100 at any point. For example, the reactor feed via line 137 can be introduced to the cylindrical section 130, the transition section 133, the velocity reduction zone 135, to any point within the recycle line 140, or any combination thereof. Preferably, the reactor feed 137 is introduced to the recycle line 140 before or after the heat exchanger 175. In FIG. 1, the reactor feed via line 137 is introduced to the recycle line 140 after the heat exchanger 175. The nozzle 103 can be in fluid communication with the polymerization system 100 at any point. Preferably the nozzle 103 is in fluid communication with the fluidized bed 115 within the cylindrical section 130.

The reactor feed in line 137 can include any polymerizable hydrocarbon of combination of hydrocarbons. For example, the reactor feed in line 137 can be any olefin monomer including substituted and unsubstituted alkenes having two to 12 carbon atoms, such as ethylene, propylene, 1-butene, 1-pentene, 1-hexene, 1-heptene, 1-octene, 4-methylpent-1-ene, 1-decene, 1-dodecene, 1-hexadecene, and the like. The reactor feed in line 137 can also include non-hydrocarbon gas(es) such as nitrogen and/or hydrogen. The reactor feed 137 can enter the reactor at multiple locations. For example, reactor feed 137 can be introduced into the fluidized bed 115 in various ways including direct injection through a nozzle (not shown). The polymer product via line 145 can thus be a homopolymer or a copolymer, including a terpolymer, having one or more other monomeric units. For example, a polyethylene product could include at least one or more other olefins) and/or comonomer(s). The reactor feed in line 137 can also include one or more inert components such as one or more induced condensing agents or ICAs. The reactor feed in line 137 can also include other non-reactive or inert gases such as nitrogen and/or argon. The feed in lines 123, 109 can be or include a portion of the reactor feed in line 137. As such, the feed in lines 123, 109 and the reactor feed in line 137 can have the same or similar compositions with respect to one another.

The amount of ICAs that can be introduced to the reactor 101, whether via the feed in line 109 and/or the reactor feed in line 137 can provide an ICA concentration within the polymerization reactor 101 ranging from a low of about 1 mol %, about 5 mol %, or about 10 mol % to a high of about 25 mol %, about 35 mol %, or about 45 mol %, with suitable ranges comprising the combination of any two values. For example, the concentration of the ICA(s), if present, can range from about 14 mol %, about 16 mol %, or about 18 mol % to a high of about 20 mol %, about 22 mol %, or about 24 mol %, with suitable ranges comprising the combination of any two values. Suitable ICAs are described in U.S. Pat. Nos. 5,352,749; 5,405,922; 5,436, 304; and 7,122,607; and WO Publication No. 2005/113615. Condensing mode operation, such as described in U.S. Pat. Nos. 4,543,399 and 4,588,790, can also be used to assist in heat removal from the fluidized bed 115.

The amount of hydrogen in the reactor 101 can be expressed as a mole ratio relative to the total polymerizable monomer, for example, ethylene or a blend of ethylene and one or more comonomers. The amount of hydrogen used in the polymerization process can be an amount necessary to achieve the desired flow index of the final polyolefin resin. The mole ratio of hydrogen to total monomer ($H_2$:monomer) can be in a range from greater than 0.0001, or from greater than 0.0005, or from greater than 0.001, to less than 10, or less than 5, or less than 3, or less than 0.10, where a desirable range can include any combination of any upper mole ratio limit with any lower mole ratio limit described herein. Expressed another way, the amount of hydrogen in the reactor at any time can range to up to 5,000 ppm, or up to 4,000 ppm, or up to 3,000 ppm, or between 50 ppm and 5,000 ppm, or between 50 ppm and 2,000 ppm. The amount of hydrogen in the reactor can range from a low of about 1 ppm, about 50 ppmw, or about 100 ppm to a high of about 400 ppm, about 800 ppm, about 1,000 ppm, about 1,500 ppm, about 2,000 ppm, about 5,000 ppm, or about 10,000 ppm, with suitable ranges comprising the combination of any two values. In some embodiments, the ratio of hydrogen to total monomer ($H_2$:monomer) can be about 0.00001:1 to about 2:1, about 0.005:1 to about 1.5:1, or about 0.0001:1 to about 1:1.

The recycle fluid in line 140 can be compressed in the compressor 170 and then passed through the heat exchanger 175 where heat can be exchanged between the recycle fluid and a heat transfer medium. For example, during normal operating conditions a cool or cold heat transfer medium via line 171 can be introduced to the heat exchanger 175 where heat can be transferred from the recycle fluid in the recycle line 140 to produce a heated heat transfer medium via line 177 and a cooled recycle fluid. The heat exchanger 175 can be used to cool the fluidized bed 115 or heat the fluidized bed 115 depending on the particular operating conditions of the polymerization system 100, e.g., start-up, normal operation, idling, and shut down. Illustrative heat transfer mediums can include, but are not limited to, water, air, glycols, or the like. It is also possible to locate the compressor 170 downstream from the heat exchanger 175 or at an intermediate point between several heat exchangers 175.

After cooling, all or a portion of the recycle fluid in the recycle line 140, the recycle fluid can be returned to the reactor 101. The cooled recycle fluid in recycle line 140 can absorb at least a portion of the heat of reaction generated by the polymerization reaction and/or polymerize in the presence of the catalyst. The heat exchanger 175 can be of any type of heat exchanger. Illustrative heat exchangers can include, but are not limited to, shell and tube, plate and frame, U-tube, and the like. For example, the heat exchanger 175 can be a shell and tube heat exchanger where the cycle fluid via line 115 can be introduced to the tube side and the heat transfer medium can be introduced to the shell side of the heat exchanger 175. If desired, several heat exchangers can be employed, in series, parallel, or a combination of series and parallel, to lower or increase the temperature of the cycle fluid in stages.

Preferably, the cycle gas via line 140 is returned to the fluidized bed 115 through fluid distributor plate ("plate") 128. The plate 128 is preferably installed at the inlet to the reactor 101 to prevent polymer particles from settling out and agglomerating into a solid mass and to prevent liquid accumulation at the bottom of the reactor 101 as well to facilitate easy transitions between processes which contain liquid in the cycle stream 140 and those which do not and vice versa. Although not shown, the cycle gas via line 140 can be introduced into the reactor 101 through a deflector disposed or located intermediate an end of the reactor 101 and the distributor plate 128. Illustrative deflectors and distributor plates suitable for this purpose can be as described in U.S. Pat. Nos. 4,877,587; 4,933,149; and 6,627,713.

Fluid via line 161 can be separated from a polymer product recovered via line 145 from the reactor 101. The fluid can include unreacted monomer(s), hydrogen, ICA(s), and/or inerts. The separated fluid via line 161 can be introduced to the reactor 101. The separated fluid can be introduced to the recycle line 140 (not shown) and/or purged from the polymerization system 100 (not shown). The separation of the fluid can be accomplished when fluid and product leave the reactor 101 and enter the product discharge tank 155 through valve 157, which can be, for example, a ball valve designed to have minimum restriction to flow when opened. Positioned above and below the product discharge tank 155 can be valves 159, 167. The valve 167 allows passage of product therethrough. For example, to discharge the polymer product from the reactor 101, valve 157 can be opened while valves 159, 167 are in a closed position. Product and fluid enter the product discharge tank 155. Valve 157 is closed and the product is allowed to settle in the product discharge tank 155. Valve 159 is then opened permitting fluid to flow via line 161 from the product discharge tank 155 to the reactor 101. Valve 159 can then be closed and valve 167 can be opened and any product in the product discharge tank 155 can flow into and be recovered via line 168. Valve 167 can then be closed. Although not shown, the product via line 168 can be introduced to a plurality of purge bins or separation units, in series, parallel, or a combination of series and parallel, to further separate gases and/or liquids from the product. The particular timing sequence of the valves 157, 159, 167, can be accomplished by use of conventional programmable controllers which are known in the art. Another preferred product discharge system which can be alternatively employed is that described in U.S. Pat. No. 4,621,952. Another product discharge system that may be used may employ at least one (parallel) pair of tanks comprising a settling tank and a transfer tank arranged in series and having the separated gas phase returned from the top of the settling tank to a point in the reactor near the top of the fluidized bed.

The reactor 101 can be free from the use of stirring and/or wall scraping. The cycle line 140 and the elements therein (compressor 170, heat exchanger 175) can be smooth surfaced and devoid of unnecessary obstructions so as not to impede the flow of cycle fluid or entrained particles.

The conditions for polymerization can vary depending, at least in part, on the monomers, catalysts, and equipment availability. The specific conditions are known or readily derivable by those skilled in the art. As noted above, the temperature of the fluidized bed 115 can be from about −10° C. to about 140° C. The pressure within the reactor 101 can be from about 10 kPag to about 10,000 kPag, or from about 500 kPag to about 5,000 kPag, or from about 1,000 kPag to about 2,200 kPag. Additional details of polymerization are described in U.S. Pat. No. 6,627,713.

The reactor 101 can be capable of producing from about 10 kg of polymer per hour to about 90,900 kg/hr. For example, reactor 101 may be capable of producing greater than about 455 kg of polymer per hour, or greater than about 4,540 kg/hr, or greater than about 11,300 kg/hr, or greater than about 15,900 kg/hr, or greater than about 22,700 kg/hr, or from about 29,000 kg/hr to about 45,500 kg/hr.

Various systems and/or methods can be used to monitor and/or control the degree or level of fouling within the reactor 101. For example, if the polymerization system 100 is operated in condensed mode, a common technique for monitoring the polymerization can include monitoring a stickiness control parameter ("dMRT") such as a reduced melt initiation temperature or "dMIT" value, which can provide an estimate as to the degree of polymer stickiness within the reactor 101. Another method for monitoring polymerization can include estimating acoustic emissions within the reactor 101, which can also provide an estimate as to the degree of polymer stickiness within the reactor 101.

Other illustrative techniques that can also be used to reduce or eliminate fouling and/or sheeting can include the introduction of finely divided particulate matter to prevent agglomeration, as described in U.S. Pat. Nos. 4,994,534 and 5,200,477 and/or the addition of negative charge generating chemicals to balance positive voltages or the addition of positive charge generating chemicals to neutralize negative voltage potentials as described in U.S. Pat. No. 4,803,251. Antistatic substances can also be added, either continuously or intermittently to prevent or neutralize electrostatic charge generation. Condensing mode operation, such as described in U.S. Pat. Nos. 4,543,399 and 4,588,790 can also be used to assist in heat removal from the fluid bed polymerization reactor.

As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the catalyst compound(s) being used. For example, the use of static control agents is described in European Patent No. 0229368 and U.S. Pat. Nos. 4,803,251; 4,555,370; and 5,283,278, and references cited therein.

Control agents such as aluminum stearate may also be employed. The static control agent used may be selected for its ability to receive the static charge in the fluidized bed without adversely affecting productivity. Suitable static control agents may include aluminum distearate, ethoxlated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include, ethyleneimine additives useful in embodiments disclosed herein may include polyethyleneimines having the following general formula:

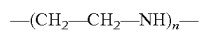

where n can be from about 10 to about 10,000. The polyethyleneimines may be linear, branched, or hyperbranched (i.e., forming dendritic or arborescent polymer structures). They can be a homopolymer or copolymer of ethyleneimine or mixtures thereof (referred to as polyethyleneimine(s) hereafter). Although linear polymers represented by the chemical formula —[$CH_2 CH_2 NH$]— may be used as the polyethyleneimine, materials having primary, secondary, and tertiary branches can also be used. Commercial polyethyleneimine can be a compound having branches of the ethyleneimine polymer. Suitable polyethyleneimines are commercially available from BASF Corporation under the trade name Lupasol. These compounds can be prepared as a wide range of molecular weights and product activities. Examples of commercial polyethyleneimines sold by BASF suitable for use in the present invention include, but are not limited to, Lupasol FG and Lupasol WF.

Another useful continuity additive can include a mixture of aluminum distearate and an ethoxylated amine type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt % to about 50 wt % or about 10 wt % to about 40 wt %, or about 15 wt % to about 30 wt %. Other useful static control agents and additives are described in U.S. Patent Application Publication No. 2008/0045663.

The continuity additive(s) or static control agent(s) may be added to the reactor in an amount ranging from 0.05 to 200 ppm, based on the weight of all feeds to the reactor, excluding recycle, more preferably in an amount ranging from 2 to 100 ppm; more preferably from 4 to 50 Ppm.

Additional reactor details and means for operating the reactor can be as described in, for example, U.S. Pat. Nos. 3,709,853; 4,003,712; 4,011,382; 4,302,566; 4,543,399; 4,882,400; 5,352,749; and 5,541,270; EP 0802202.

Figure 2:
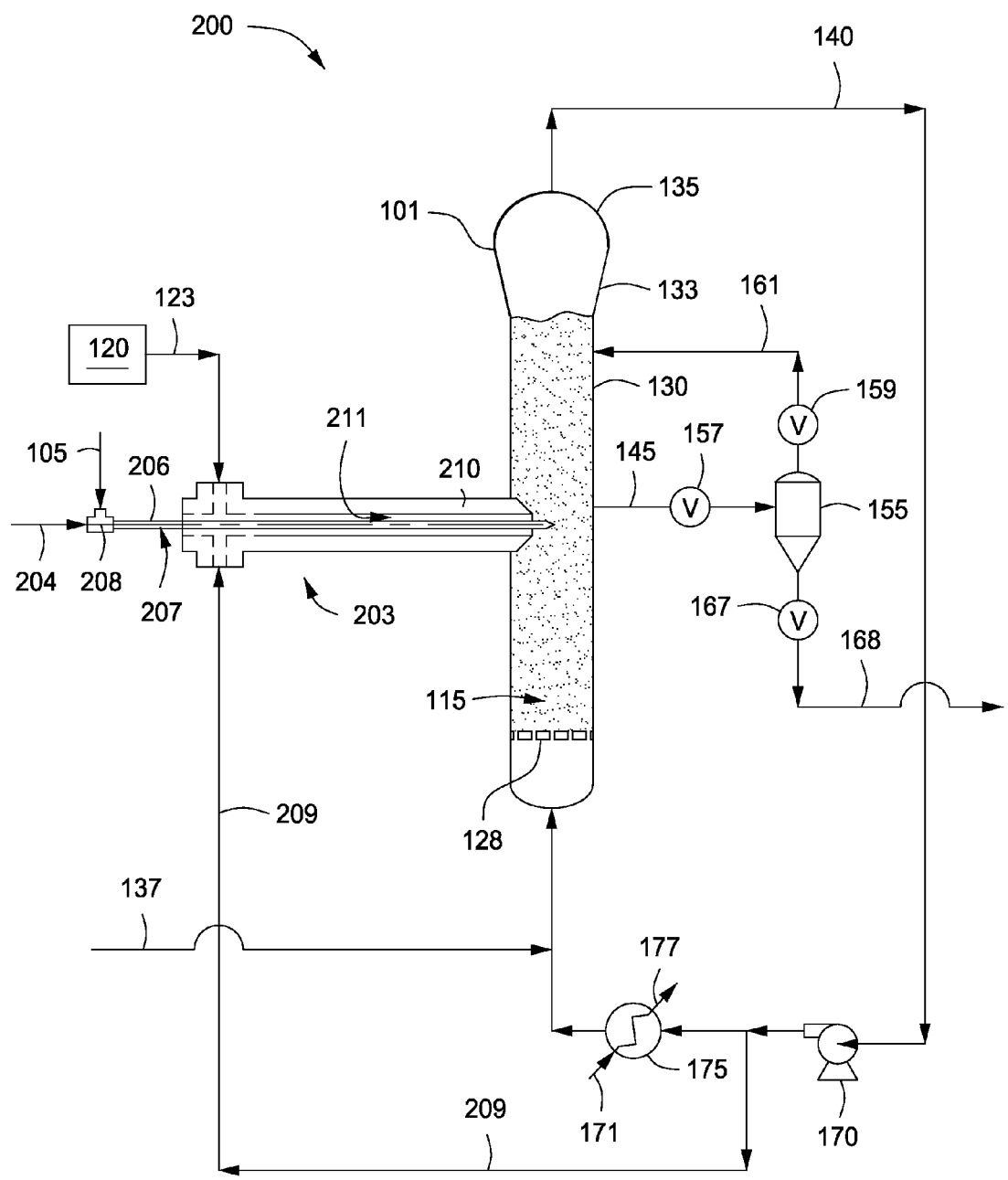
FIG. 2 depicts an illustrative gas phase polymerization system for making polymers.

FIG. 2 depicts another illustrative gas phase polymerization system 200 for making polymers, according to one or more embodiments. The polymerization system 200 can include a reactor 101 in fluid communication with one or more discharge tanks 155, compressors 170, and heat exchangers 175, which can be as described above with reference to FIG. 1. The polymerization system 200 can also include one or more catalyst introduction nozzles or "nozzles" 203. The catalyst via line 105 and a feed via line 209 can be introduced via the nozzle 203 into the fluidized bed 115 disposed within the reactor 101. One or more inert purge gases via line 204 can also be introduced to the fluidized bed 115 disposed within the reactor 101 via the nozzle 203. The feed via line 123 that can be provided by the feed source 120, as described above with reference to FIG. 1, can also be introduced to the nozzle 203.

The nozzle 203 can include a first or "catalyst" conduit 206, a second or "purge gas" conduit 208, and a third or "support" conduit 210. The catalyst conduit 206 can surround an outer surface of the purge gas conduit 208, and the support conduit 210 can at least partially surround an outer surface of the catalyst conduit 206. Accordingly, both the catalyst conduit 206 and the purge gas conduit 208 can be at least partially surrounded by the support conduit 210. The purge gas conduit 208 can include one or more holes, apertures, orifices, or other openings proximal to the discharge end of nozzle 203 that can provide fluid communication between the purge gas conduit 208 and the catalyst conduit 206, such that a fluid flowing through the purge gas conduit 208 can exit into the catalyst conduit 206. Additional details of the nozzle 203 can be as described in U.S. Pat. No. 7,989,562 and U.S. Patent Application Publication No. 2010/0041841. The nozzle 203 can also be referred to as a "tube assembly in a tube nozzle," where the tube assembly includes a tube within a tube.

The nozzle 203 can convey, transport, direct, inject, disperse, distribute, or otherwise introduce the catalyst in line 105 into the fluidized bed 115 via a first flow path 207 formed between the outer surface of the purge gas conduit 208 and the inner surface of the catalyst conduit 206 through nozzle 203. The nozzle 203 can also convey, transport, direct, inject, or otherwise introduce the feed in line 123 and/or 209 into the fluidized bed 115 via one or more second flow paths 211 formed between an outer surface of the catalyst conduit 206 and an inner surface of the support conduit 210 through nozzle 203. The nozzle 203 can also convey, transport, direct, inject, or otherwise introduce a purge gas in line 204 through the purge gas conduit 208, and the purge gas can exit the one or more holes, apertures, orifices, or openings in the purge gas conduit 208 and can mix with the catalyst.

As shown in FIG. 2, the feed via line 209 can be or include a portion of the recycle fluid in line 140. Similar to the feed in line 109 described above with reference to FIG. 1, the recycle fluid in line 140 can be at a temperature above ambient temperature when introduced to the nozzle 203 and/or heated to a temperature at or above ambient temperature within the nozzle 203. For example, if ambient temperature is 25° C. where the polymerization system 200 is operating, then the feed in line 209 can be at a temperature above 25° C. The productivity of the catalyst in line 105 can be increased within the reactor 101 at least 1%, at least 3%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, at least 105%, at least 110%, at least 115%, or at least 120% by introducing the feed in line 209 to the nozzle 203 (or heating within the nozzle 203) at a temperature greater than the ambient temperature where the polymerization system 200 is being operated. For example, the productivity of the catalyst can be increased within the reactor 100 by increasing the temperature of the support to flow in line 209 to greater than the ambient temperature where the polymerization system 100 is being operated in an amount from a low of about 1%, about 10%, about 25%, about 45%, about 55%, about 60%, about 65% or about 70% to a high of about 95%, about 110%, about 125%, about 150%, about 160%, about 170%, about 180%, about 190%, about 200%, about 210%, or about 225%, with suitable ranges comprising the combination of any two values. In another example, the productivity of the catalyst can be increased within the reactor 101 by increasing the temperature of the support to flow in line 209 to greater than the ambient temperature where the polymerization system 200 is being operated in an amount from a low of about 1%, about 3%, about 5%, about 10%, about 12%, about 15%, about 17% or about 20% to a high of about 30%, about 33%, about 35%, about 37%, about 40%, about 45%, about 50%, about 55%, about 50%, or about 55%, with suitable ranges comprising the combination of any two values. In still another example, the productivity of the catalyst can be increased by about 5% to about 15%, about 10% to about 25%, about 15% to about 35%, about 25% to about 45%, about 30% to about 45%, about 30% to about 50%, about 35% to about 60%, about 14% to about 40.5%, or about 31% to about 40.5% by introducing the feed in line 209 at a temperature greater than the ambient temperature where the polymerization system 200 is being operated. In yet another example, the productivity of the catalyst can be increased by about 15% to about 45%, about 40% to about 80%, about 55% to about 95%, about 85% to about 105%, about 70% to about 120%, about 100% to about 160%, about 125% to about 175%, about 140% to about 210%, or about 130% to about 190% by increasing the temperature of the feed in line 209 to a temperature greater than the ambient temperature where the polymerization system 100 is being operated.

The temperature of the feed in line 209 can be greater than ambient temperature and up to about a temperature of the fluidized bed 115, equal to the temperature of the fluidized bed 115, or greater than the temperature of the fluidized bed. The temperature of the feed in line 209 can be at a temperature from a low of about 25° C., about 35° C., about 45° C., or about 55° C. to a high of about 70° C., about 80° C., about 90° C., about 100° C., or about 110° C., with suitable ranges comprising the combination of any two values. For example, the temperature of the feed in line 209 can be from about 50° C. to about 110° C., about 70° C. to about 100° C., about 85° C. to about 105° C., about 80° C. to about 97° C., about 90° C. to about 103° C., or about 93° C. to about 110° C. In another example, the temperature of the feed in line 209 can exceed the ambient temperature the polymerization system 100 is operating in by at least 5° C., at least 10° C., at least 15° C., at least 20° C., at least 25° C., at least 30° C., at least 35° C., at least 40° C., at least 50° C., at least 55° C., at least 60° C., at least 65° C., at least 70° C., at least 75° C., or at least 80° C.

The temperature of the feed in line 209 can also be referenced with respect to a temperature of the fluidized bed 115 within the reactor 101. Depending on the particular polymer product being produced within the reactor 101, the temperature of the fluidized bed 115 can widely vary. For example, the temperature of the fluidized bed 115 can range from about −10° C. to about 140° C., or about 50° C. to about 130° C., or about 75° C. to about 120° C. The temperature of the feed in line 209 may be equal to or greater than a temperature that is not less than 50° C., not less than 45° C., not less than 40° C., not less than 35° C., not less than 30° C., not less than 25° C., not less than 20° C., not less than 15° C., not less than 10° C., not less than 5° C., or not less than 1° C. below the temperature of the fluidized bed 115. In another example, the temperature of the fluid in line 209 can be equal to or greater than the temperature of the fluidized bed 115. For example, the temperature of the feed in line 209 can exceed the temperature of the fluidized bed 115 by about 1° C. or more, about 3° C. or more, about 5° C. or more, about 7° C. or more, about 10° C. or more, about 13° C. or more, about 15° C. or more, about 17° C. or more, about 20° C. or more, about 25° C. or more, about 30° C. or more, or about 35° C. or more.

Alternatively, or in addition to the feed in line 209 being at a temperature above ambient temperature, the inert purge gas in line 204 can be at a temperature greater than ambient temperature. For example, the temperature of the inert purge gas in line 204 can be at a temperature from a low of about 25° C., about 35° C., about 45° C., or about 55° C. to a high of about 70° C., about 80° C., about 90° C., about 100° C., or about 110° C., with suitable ranges comprising the combination of any two values. In another example, the temperature of the inert purge gas in line 204 can be from about 50° C. to about 110° C., about 70° C. to about 100° C., about 85° C. to about 105° C., about 80° C. to about 97° C., about 90° C. to about 103° C., or about 93° C. to about 110° C. In another example, the temperature of the inert purge gas in line 204 can exceed the ambient temperature the polymerization system 100 is operating in by at least 5° C., at least 10° C., at least 15° C., at least 20° C., at least 25° C., at least 30° C., at least 35°

C., at least 40° C., at least 50° C., at least 55° C., at least 60° C., at least 65° C., at least 70° C., at least 75° C., or at least 80° C.

The temperature of the inert purge gas in line 204 can also be referenced with respect to a temperature of the fluidized bed 115 within the reactor 101. For example, the temperature of the inert purge gas in line 204 can be equal to or greater than a temperature that is not less than 50° C., not less than 45° C., not less than 40° C., not less than 35° C., not less than 30° C., not less than 25° C., not less than 20° C., not less than 15° C., not less than 10° C., not less than 5° C., or not less than 1° C. below the temperature of the fluidized bed 115. In another example, the temperature of the inert purge gas in line 204 can be equal to or greater than the temperature of the fluidized bed 115. For example, the temperature of the inert purge gas in line 204 can exceed the temperature of the fluidized bed 115 by about 1° C. or more, about 3° C. or more, about 5° C. or more, about 7° C. or more, about 10° C. or more, about 13° C. or more, about 15° C. or more, about 17° C. or more, about 20° C. or more, about 25° C. or more, about 30° C. or more, or about 35° C. or more.

The one or more heat exchangers 125 depicted in FIG. 1 (and/or the optional heated nozzle 103) can be eliminated or a size of the heat exchanger 125 (or other heating means such as a heated nozzle) can be reduced as compared to the polymerization system 100 by introducing a portion of the recycle fluid in line 140 as at least a portion of the feed via line 209. The feed in line 209 can be recovered from the recycle fluid line 140 at any location or combination of locations. For example, the feed in line 209 can be recovered from the recycle fluid line 140 between the reactor 101 and the compressor 170, between the compressor 170 and the heat exchanger 175, between the heat exchanger 175 and the reactor 101, or any combination thereof. Preferably the feed in line 209 is recovered from the recycle fluid line 140 at a location between the compressor 170 and the heat exchanger 175 and/or the heat exchanger 175 and the reactor 201.

As shown in FIG. 2, the feed introduced to the nozzle 203 can be or include the feed via line 123 and the feed via line 209, which can mix, blend, combine, or otherwise contact one another within the nozzle 203 to form a combined fluid. In other words, a first portion of the total feed introduced to the nozzle 203 can include the recycle fluid in line 140 and a second portion of the total feed introduced to the nozzle 203 can be the feed in line 123 (without heating as shown and/or with heating as discussed and described above with reference to FIG. 1). In some embodiments, there may no feed to the nozzle 203 from line 123 and the total feed introduced to the nozzle 203 can be composed of recycle feed via line 209 recovered from the recycle line 140.

Depending on the particular polymerization process being carried out in the polymerization system 200, the composition of the recycle fluid in line 140, and hence the composition of the feed in line 209, can widely vary. The recycle fluid in line 140 can include the one or more monomers, e.g., ethylene or ethylene and one or more comonomers, inert gases, e.g., nitrogen and/or argon, other non-hydrocarbon gases, e.g., hydrogen, ICAs, catalyst, polymer particles, or any combination thereof. As noted above, the concentration of catalyst and/or polymer particles in the recycle fluid in line 140 can be less than about 10% wt, less than about 8% wt, less than about 5% wt, less than about 4% wt, less than about 3% wt, less than about 2% wt, less than about 1% wt, less than about 0.5% wt, or less than about 0.2% wt of the particles, e.g., catalyst and/or polymer particles, entrained in fluidized bed 115.

The concentration of the one or more monomers in the recycle fluid in line 140 can be from a low of about 40 mol %, about 50 mol %, about 55 mol %, or about 60 mol % to a high of about 65 mol %, about 70 mol %, about 75 mol %, about 80 mol %, about 85 mol %, about 90 mol %, or about 95 mol %, or about 99 mol %, with suitable ranges comprising the combination of any two values. For example, the amount of the one or more monomers in the recycle fluid in line 140 can be from about 55 mol % to about 85 mol %, about 60 mol % to about 80 mol %, about 65 mol % to about 75 mol %, about 70 mol % to about 80 mol %, or about 50 mol % to about 90 mol %. The concentration of the one or more ICAs, if present, in the recycle fluid in line 140 can be from a low of about 0.01 mol %, about 0.1 mol %, about 1 mol %, about 3 mol %, or about 5 mol % to a high of about 8 mol %, about 10 mol %, about 15 mol %, about 20 mol %, about 25 mol %, about 30 mol %, or about 40 mol %, with suitable ranges comprising the combination of any two values. For example, the amount of the one or more ICAs, if present, in the recycle fluid in line 140 can be from about 1 mol % to about 25 mol %, about 3 mol % to about 10 mol %, about 5 mol % to about 20 mol %, about 7 mol % to about 15 mol %, about 10 mol % to about 20 mol %, or about 6 mol % to about 18 mol %. The concentration of hydrogen, if present, in the recycle fluid in line 140 can be from a low of about 100 ppm, about 500 ppm, about 1,000 ppm, or about 1,500 ppm to a high of about 3,000 ppm, about 5,000 ppm, about 7,000 ppm, or about 10,000 ppm, with suitable ranges comprising the combination of any two values. The concentration of the one or more inert gases and/or liquids, e.g., nitrogen and/or argon, if present, in the recycle fluid in line 140 can range from a low of about 1 mol %, about 5 mol %, about 10 mol %, or about 15 mol % to a high of about 20 mol %, about 30 mol %, about 40 mol %, about 50 mol %, or about 60 mol %, with suitable ranges comprising the combination of any two values. For example, the amount of the one or more inert gases and/or liquids in line 140, if present, can range from about 5 mol % to about 30 mol %, about 10 mol % to about 35 mol %, about 15 mol % to about 25 mol %, about 15 mol % to about 40 mol %, or about 10 mol % to about 25 mol %.

The feed via line 209 can be introduced to the nozzle 203 at a rate ranging from a low of about 100 kg/hr, about 450 kg/hr, about 800 kg/hr, about 1,000 kg/hr, or about 1,200 kg/hr to a high of about 1,350 kg/hr, about 1,500 kg/hr, about 1,800 kg/hr, about 2,000 kg/hr, about 2,200 kg/hr, about 2,500 kg/hr, about 2,700 kg/hr, or about 3,000 kg/hr, with suitable ranges comprising the combination of any two values. The amount of the feed via line 209 introduced to the nozzle 103 can be less than about 30 wt %, less than about 25 wt %, less than about 20 wt %, less than about 15 wt %, less than about 10 wt %, less than about 7 wt %, less than about 5 wt %, or less than about 2 wt %, based on the amount of the one or more monomers consumed in the reactor 101. The amount of feed via line 209 and, if optionally via line 123, introduced to the nozzle 103 can be less than about 30 wt %, less than about 25 wt %, less than about 20 wt %, less than about 15 wt %, less than about 10 wt %, less than about 7 wt %, less than about 5 wt %, or less than about 2 wt %, based on the amount of the one or more monomers consumed in the reactor 101. For example, the amount of the feed via line 209 introduced to the nozzle 203 can be from a low of about 10 wt %, about 12 wt %, about 15 wt %, or about 17 wt % to a high of about 20 wt %, about 23 wt %, about 25 wt %, about 27 wt %, or about 30 wt %, based on the amount of the one or more monomers consumed in the reactor 101, with suitable ranges comprising the combination of any two values. In another example, the amount of the feed introduced via line 209 to the nozzle 203 can be from about 10 wt % to about 30 wt %, about 15 wt % to about 25 wt %, about 18 wt % to about 26 wt %, about 19 wt % to about 22 wt %, or about 13 wt % to about 27 wt %, based on the amount of the one or more monomers consumed in the reactor 101. In one or more embodiments, the amount of the feed via line 209 and/or 123 introduced to the nozzle 103 can be greater than the amount of the one or more monomers consumed in the reactor 101, e.g., during reactor start-up, idle conditions, and/or shut-down.

It should be noted that any nozzle can be used for introducing the catalyst via line 105 and the feed 209. Depending on the particular configuration of the nozzle, the purge gas via line 204 may or may not be introduced thereto. For example, the particular configuration of the nozzle 103 discussed and described above with reference to FIG. 1 does not need a purge gas flow. Illustrative nozzles can be similar to those discussed and described in U.S. Pat. Nos. 5,693,727; 5,962,606; 6,075,101; 6,211,310; 6,489,408; 6,500,905; and 7,989,562; U.S. Patent Application Publication Nos.: 20100298493 and 20100041841; and WO Publication Nos.: WO/2002/038629A2; WO/2008/042177A1; WO/2008/042078A1; and WO/2008/042182A1.

It should also be noted that the nozzle 103 can be utilized in the polymerization system 200. Likewise, the nozzle 203 can be used in the polymerization system 100. Said another way, a portion of the recycle fluid in line 140 can provide at least a portion of the feed to any nozzle configured to introduce the catalyst in line 105 to the fluidized bed 115 disposed within the reactor 101 of the polymerization systems 100, 200. The operation of the polymerization system 200 and the catalyst in line 105 can be as discussed and described above with reference to the polymerization system 100.

Considering the polymer product via line 168, the polymer can be or include any type of polymer or polymeric material. Illustrative polymers include, but are not limited to, polyolefins, polyamides, polyesters, polycarbonates, polysulfones, polyacetals, polylactones, acrylonitrile-butadiene-styrene polymers, polyphenylene oxide, polyphenylene sulfide, styrene-acrylonitrile polymers, styrene maleic anhydride, polyimides, aromatic polyketones, or mixtures of two or more of the above. Suitable polyolefins can include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, or $C_3$ to $C_{10}$ alpha-olefins. Preferred polyolefins include, but are not limited to, polymers comprising ethylene, including but not limited to ethylene copolymerized with a $C_3$ to $C_{40}$ olefin, preferably a $C_3$ to $C_{20}$ alpha olefin, such as propylene and/or butene.

Preferred polymer products include homopolymers or copolymers of $C_2$ to $C_{40}$ olefins, preferably $C_2$ to $C_{20}$ olefins, such as copolymers of an alpha-olefin and another olefin or alpha-olefin (ethylene can be defined to be an alpha-olefin). In one or more embodiments, the polymers are or include homopolyethylene, homopolypropylene, propylene copolymerized with ethylene and or butene, ethylene copolymerized with one or more of propylene, butene or hexene, and optional dienes. Examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymers of propylene and ethylene and/or butene and/or hexene, elastomers such as ethylene propylene rubber, ethylene propylene diene monomer rubber, neoprene, and blends of thermoplastic polymers and elastomers, such as for example thermoplastic elastomers and rubber toughened plastics.

Density can be determined in accordance with ASTM D-792. Density is expressed as grams per cubic centimeter ($g/cm^3$) unless otherwise noted. The polyethylene can have a density ranging from a low of about 0.89 $g/cm^3$, about 0.90 $g/cm^3$, or about 0.91 $g/cm^3$ to a high of about 0.95 $g/cm^3$, about 0.96 $g/cm^3$, or about 0.97 $g/cm^3$, with suitable ranges comprising the combination of any two values. The polyethylene can have a bulk density, measured in accordance with ASTM D1895 method B, of from about 0.25 $g/cm^3$ to about 0.5 $g/cm^3$. For example, the bulk density of the polyethylene can range from a low of about 0.30 $g/cm^3$, about 0.32 $g/cm^3$, or about 0.33 $g/cm^3$ to a high of about 0.40 $g/cm^3$, about 0.44 $g/cm^3$, or about 0.48 $g/cm^3$, with suitable ranges comprising the combination of any two values.

The polyethylene can be suitable for such articles as films, fibers, nonwoven and/or woven fabrics, extruded articles, and/or molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or nonwoven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc.

Examples

To provide a better understanding of the foregoing discussion, the following non-limiting examples are provided. All parts, proportions and percentages are by weight unless otherwise indicated.

Pilot Plant Gas Phase Fluidized Bed Polymerization Process

In the following Examples 1-4, a mixed catalyst system that produced bimodal polyethylene was evaluated using a pilot plant gas phase polymerization process. The polymerization reactions were conducted in a continuous pilot-scale gas phase fluidized bed reactor of 0.57 meters internal diameter and 4 meters in bed height. The fluidized bed was made up of polymer granules. The gaseous feed streams of ethylene and hydrogen together with liquid comonomer (Hexene) were mixed together in a mixing tee arrangement and introduced below the reactor bed into the recycle gas line. The individual flow rates of ethylene, hydrogen, and comonomer were controlled to maintain fixed composition targets. The comonomer was also controlled to maintain a constant comonomer to ethylene mole ratio. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream. Isopentane was also feed to the reactor.

The reaction bed of growing polymer particles within the reactor was maintained in a fluidized state by the continuous flow of a make-up feed and recycle gas through the reaction zone. To maintain the fluidized state within the reactor the superficial gas velocity was kept from 0.6 m/s to 0.8 m/s was.

The reactor was operated at a total pressure of 2,170 kPa and the reactor temperature was adjusted based depending on desired product.

The mixed catalyst system was mixed with carrier fluids (isopentane and nitrogen) to provide a catalyst slurry and injected directly into the reactor by using nozzle having a tube in a tube assembly that was disposed inside a support tube and the tip of the tube in a tube assembly extended past the end of the support tube by 6 mm to 26 mm. The outer diameter of the catalyst tube assembly was 6.35 mm. The support tube was a pipe inserted inside the reactor that had a hole bored with a diameter of 15.875 mm. The rate of the catalyst slurry introduced to the reactor was adjusted to maintain a constant production rate of polymer. In the annular space between the outside of the catalyst tube and the inside of the support tube, a flow of gas "fluid" was used to help disperse the catalyst into the reactor and to keep the tip of the catalyst tube clean to prevent formation of agglomerates. The feed was recycle or "cycle" gas recovered from the top of the reactor and contained primarily ethylene along with hydrogen, comonomer, and isopentane. The feed was introduced at a rate of about 1,000 kg/hr.

The fluidized bed was maintained at a height at about 4 meters by withdrawing a portion of the bed at a rate equal to the rate of formation of particulate product. The rate of product formation (the polymer production rate) was in the range of 45 kg/hour to 90 kg/hour. The product was removed semi-continuously via a series of valves into a fixed volume chamber, which was simultaneously vented back to the reactor, which provided an efficient removal of the product while at the same time recycled a large portion of the un-reacted gases back to the reactor. The recovered product was purged to remove entrained and dissolved hydrocarbons and treated with a small steam of humidified nitrogen to deactivate any trace quantities of residual catalyst. To maintain a constant reactor temperature, the temperature of the recycle gas entering the reactor was adjusted, i.e., heated or cooled as necessary, to accommodate any changes in the rate of heat generation due to the polymerization.

Mixed Catalyst System

The mixed catalyst system used in Examples 1, 3, and 4 included a first metallocene catalyst compound, $((Me_4Cp)(n\text{-}pr\text{-}Cp)ZrMe_2)$, used as a solution trim catalyst in conjunction with a mixture of a non-metallocene catalyst (HN5 or $[(2,3,4,5,6\text{-}Me_5C_6)NCH_2CH_2]_2NHZrBz_2$, where Bz is a benzyl group), and a second metallocene catalyst, $((Me_4Cp)(n\text{-}pr\text{-}Cp)ZrCl_2)$. The mixed catalyst system used a methylaluminoxane activator. The mixed catalyst system used in Example 2 included only the non-metallocene catalyst and the second metallocene catalyst. Methods of preparing catalysts of this type are disclosed in, for example, U.S. Pat. No. 6,271,325.

In Example 1, four separate polymerization runs (Runs 1A, 1B, 1C, and 1D) were conducted with each one operating with a different feed temperature. Table 1 summarizes the polymerization results for Example 1, polymerization runs 1A-D.

TABLE 1

| | Example 1 | | | |
|---|---|---|---|---|
| Polymerization Run | 1A | 1B | 1C | 1D |
| Reactor Conditions | | | | |
| Residence Time (hrs) | 7.08 | 5.82 | 5.28 | 5.72 |
| $C_2$ Partial Pressure (psia) | 220 | 220 | 220 | 220 |
| $H_2/C_2$ Conc. Ratio (ppm/m %) | 20.03 | 20.00 | 20.03 | 19.99 |
| $C_6/C_2$ Conc. Ratio (m/m) | 0.0057 | 0.0056 | 0.0057 | 0.0057 |
| Ethylene (mol %) | 70.0 | 70.0 | 70.0 | 70.0 |
| Isopentane (mol %) | 7.7 | 7.7 | 7.7 | 7.7 |
| Nitrogen (mol %) | 21.79 | 21.73 | 21.79 | 21.75 |
| Reaction Pressure (psig) | 300.0 | 300.0 | 300.0 | 300.0 |
| Reaction Temperature (° C.) | 105.7 | 105.9 | 105.7 | 105.9 |
| Gas Velocity (ft/sec) | 1.95 | 1.95 | 1.95 | 1.95 |
| Bed Weight (lbs) | 593 | 592 | 593 | 595 |
| Fluid Bulk Density (lb/ft³) | 13.17 | 14.81 | 13.17 | 11.06 |
| Prod Rate (lbs/hr) | 84 | 102 | 112 | 104 |
| First Metallocene Trim Flow, (g/hr) | 52.0 | 52.0 | 52.0 | 42.5 |
| Product Properties | | | | |
| $I_5$, Melt Index (dg/min) | 0.11 | 0.12 | 0.14 | 0.12 |
| $I_{21}$, High Load Melt Index (dg/min) | 3.03 | 3.55 | 4.56 | 3.56 |
| Melt Flow Ratio ($I_{21}/I_5$) | 28.86 | 30.52 | 33.78 | 30.65 |
| Density (g/cc) | 0.9474 | 0.9478 | 0.9478 | 0.9470 |
| Catalyst Productivity | | | | |
| Material Balance Cat. Prod. (g PE/g Catalyst) | 6,632 | 8,054 | 8,889 | 9,319 |
| Recycle Gas Feed Temperature, ° C. | 40.55 | 53.61 | 75.83 | 96.50 |
| Plenum Flow (lb/hr) | 2,064.0 | 2,064.7 | 2,064.0 | 2,053.5 |

In Example 2, two separate polymerization runs (Runs 2A and 2B) were conducted at different feed temperatures. Table 2 summarizes the polymerization results for Example 2, polymerization runs 2A and B.

TABLE 2

| | Example 2 | |
|---|---|---|
| Polymerization Run | 2A | 2B |
| Reactor Conditions | | |
| Residence Time (hrs) | 6.67 | 5.15 |
| $C_2$ Partial Pressure (psia) | 220 | 220 |
| $H_2/C_2$ Conc. Ratio (ppm/m %) | 20.01 | 20.01 |
| $C_6/C_2$ Conc. Ratio (m/m) | 0.0064 | 0.0064 |
| Ethylene (mol %) | 70.0 | 70.0 |
| Isopentane (mol %) | 6.9 | 6.9 |
| Nitrogen (mol %) | 22.52 | 22.55 |
| Reaction Pressure (psig) | 300.0 | 300.0 |
| Reaction Temperature (° C.) | 105.9 | 105.9 |
| Gas Velocity (ft/sec) | 1.95 | 1.95 |
| Bed Weight (lbs) | 589 | 595 |
| Fluid Bulk Density (lb/ft³) | 15.68 | 14.34 |
| Prod Rate (lbs/hr) | 88 | 116 |
| First Metallocene Trim Flow, (g/hr) | 0 | 0 |
| Product Properties | | |
| $I_5$, Melt Index (dg/min) | 0.05 | 0.05 |
| $I_{21}$, High Load Melt Index (dg/min) | 1.01 | 1.06 |
| Melt Flow Ratio ($I_{21}/I_5$) | 18.78 | 20.00 |
| Density (g/cc) | 0.9419 | 0.9420 |
| Catalyst Productivity | | |
| Material Balance Cat. Prod. (g PE/g Catalyst) | 3,954 | 5,170 |
| Recycle Gas Feed Temperature, ° C. | 46.67 | 77.78 |
| Plenum Flow (lb/hr) | 2,192.5 | 2,189.1 |

In Example 3, three separate polymerization runs (Runs 3A-C) were conducted at different feed temperatures. Table 3 summarizes the polymerization results for Example 3, polymerization runs 3A-C.

TABLE 3

| | Example 3 | | |
|---|---|---|---|
| Polymerization Run | 3A | 3B | 3C |
| Reactor Conditions | | | |
| Residence Time (hrs) | 5.42 | 4.89 | 5.01 |
| $C_2$ Partial Pressure (psia) | 220 | 220 | 220 |
| $H_2/C_2$ Conc. Ratio (ppm/m %) | 20.03 | 20.02 | 20.02 |
| $C_6/C_2$ Conc. Ratio (m/m) | 0.0070 | 0.0073 | 0.0070 |
| Ethylene (mol %) | 70.1 | 70.0 | 70.0 |
| Isopentane (mol %) | 7.0 | 7.1 | 7.1 |
| Nitrogen (mol %) | 22.26 | 22.29 | 22.31 |
| Reaction Pressure (psig) | 300.0 | 300.0 | 300.0 |
| Reaction Temperature (° C.) | 105.8 | 105.9 | 105.8 |
| Gas Velocity (ft/sec) | 1.95 | 1.95 | 1.95 |
| Bed Weight (lbs) | 595 | 596 | 596 |
| Fluid Bulk Density (lb/ft$^3$) | 15.73 | 14.49 | 12.63 |
| Prod Rate (lbs/hr) | 110 | 122 | 119 |
| First Metallocene Trim Flow, (g/hr) | 44.2 | 37.2 | 36.4 |
| Product Properties | | | |
| $I_5$, Melt Index (dg/min) | 0.14 | 0.13 | 0.13 |
| $I_{21}$, High Load Melt Index (dg/min) | 4.43 | 4.36 | 4.40 |
| Melt Flow Ratio ($I_{21}/I_5$) | 32.52 | 33.60 | 34.20 |
| Density (g/cc) | 0.9468 | 0.9463 | 0.9464 |
| Catalyst Productivity | | | |
| Material Balance Cat. Prod. (g PE/g Catalyst) | 6,651 | 8,964 | 8,738 |
| Recycle Gas Feed Temperature, ° C. | 37.72 | 68.11 | 93.33 |
| Plenum Flow (lb/hr) | 1,996.9 | 2,062.5 | 2,065.5 |

In Example 4, three separate polymerization runs (Runs 4A-C) were conducted at different feed temperatures. Table 4 summarizes the polymerization results for Example 4, polymerization runs 4A-C.

TABLE 4

| | Example 4 | | |
|---|---|---|---|
| Polymerization Run | 4A | 4B | 4C |
| Reactor Conditions | | | |
| Residence Time (hrs) | 4.56 | 4.93 | 5.09 |
| $C_2$ Partial Pressure (psia) | 221 | 220 | 220 |
| $H_2/C_2$ Conc. Ratio (ppm/m %) | 20.01 | 20.03 | 20.11 |
| $C_6/C_2$ Conc. Ratio (m/m) | 0.0056 | 0.0052 | 0.0052 |
| Ethylene (mol %) | 70.1 | 70.0 | 69.9 |
| Isopentane (mol %) | 6.8 | 6.8 | 6.8 |
| Nitrogen (mol %) | 22.54 | 22.68 | 22.79 |
| Reaction Pressure (psig) | 300.0 | 300.0 | 300.0 |
| Reaction Temperature (° C.) | 105.9 | 105.9 | 105.9 |
| Gas Velocity (ft/sec) | 1.95 | 1.95 | 1.95 |
| Bed Weight (lbs) | 591 | 590 | 595 |
| Fluid Bulk Density (lb/ft$^3$) | 16.18 | 14.61 | 12.79 |
| Prod Rate (lbs/hr) | 130 | 120 | 117 |
| First Metallocene Trim Flow, (g/hr) | 59.8 | 54.6 | 50.3 |
| Product Properties | | | |
| $I_5$, Melt Index (dg/min) | 0.11 | 0.11 | 0.11 |
| $I_{21}$, High Load Melt Index (dg/min) | 3.72 | 3.91 | 3.78 |

TABLE 4-continued

| | Example 4 | | |
|---|---|---|---|
| Polymerization Run | 4A | 4B | 4C |
| Melt Flow Ratio ($I_{21}/I_5$) | 32.86 | 34.13 | 34.97 |
| Density (g/cc) | 0.9468 | 0.9466 | 0.9464 |
| Catalyst Productivity | | | |
| Material Balance Cat. Prod. (g PE/g Catalyst) | 5,828 | 6,326 | 6,677 |
| Recycle Gas Feed Temperature, ° C. | 39.39 | 71.22 | 93.33 |
| Plenum Flow (lb/hr) | 2,028.2 | 2,027.8 | 2,059.8 |

Figure 3:
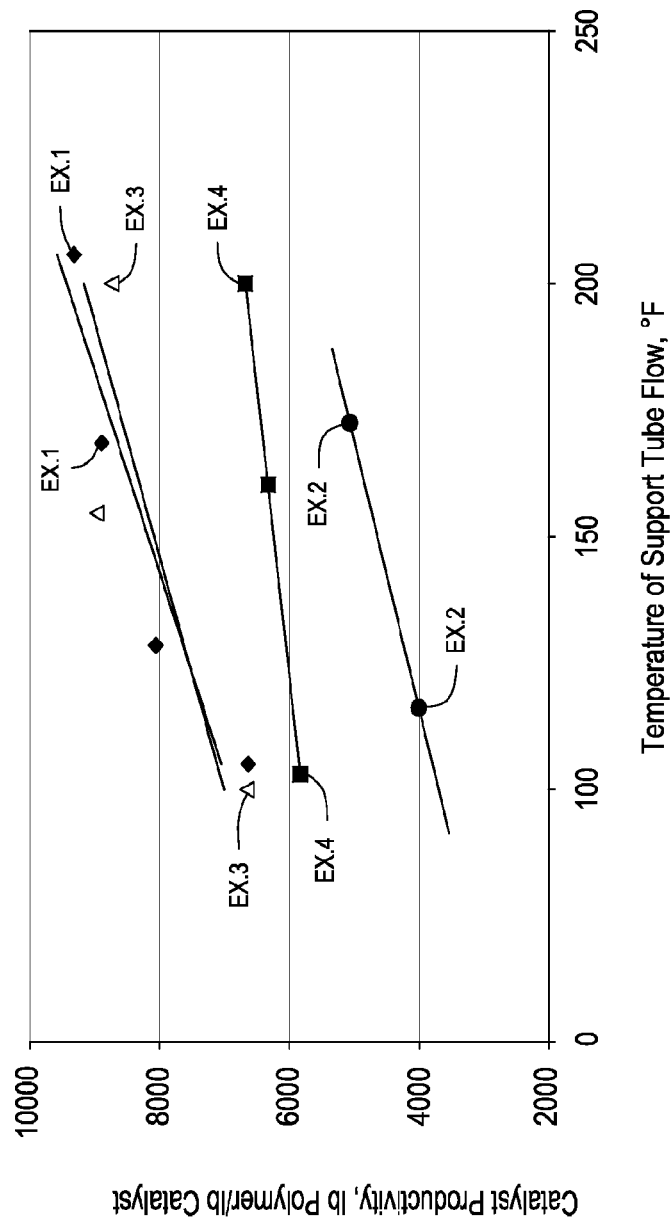
FIG. 3 depicts a graphical representation of the catalyst productivity versus temperature of a feed introduced to the catalyst injection nozzle for Examples 1-4.

As shown in Tables 1-4 and in the graph depicted in FIG. 3, surprisingly and unexpectedly the catalyst productivity (g PE/g Catalyst), in each of Examples 1-4, significantly increased as the temperature of the feed increased. More particularly, in Example 1 the catalyst productivity increased 6,632 g PE/g Catalyst to 9,319 g PE/g Catalyst when the feed temperature was increased from 40.55° C. to 96.50° C., which was about a 40.5% increase in catalyst productivity. Significant increases were also observed in Examples 2-4, where the increase in catalyst productivity was about 30.7%, about 31.4%, and about 14.6%, respectively. Accordingly, from the data shown in Tables 1-4 and the Graph in FIG. 3, increasing the temperature of the feed substantially increased the catalyst productivity. This directly contradicts the conventional thinking that it is important to maintain the feed at a reduced temperature, e.g., less than ambient temperature, to achieve satisfactory polymerization.

All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A method for olefin polymerization for increasing catalyst productivity, comprising:
   flowing a catalyst through an injection nozzle and into a fluidized bed disposed within a reactor;
   flowing a feed comprising one or more monomers, one or more inert fluids, or a combination thereof through the injection nozzle and into the fluidized bed, wherein the feed is at a temperature greater than ambient temperature, wherein the feed is at a temperature of at least 90° C.; and
   contacting one or more olefins with the catalyst within the fluidized bed at conditions sufficient to produce a polyolefin.

2. The method of claim 1, wherein the injection nozzle has two or more concentric flow paths and where the method further comprises:

flowing the catalyst through a first concentric flow path of the injection nozzle and into the reactor; and flowing the feed through a second concentric flow path of the injection nozzle and into the reactor.

3. The method of claim 1, wherein the reactor comprises a fluidized bed disposed therein, and wherein the feed is at a temperature within about 30° C. of the temperature of the fluidized bed.

4. The method of claim 1, wherein flowing the feed through the injection nozzle and into the fluidized bed increases a productivity of the catalyst by at least 5% as compared to flowing the feed through the injection nozzle and into the fluidized bed when the feed is at a temperature below ambient temperature.

5. The method of claim 1, wherein flowing the feed through the injection nozzle and into the fluidized bed increases a productivity of the catalyst by at least 15% as compared to flowing the feed through the injection nozzle and into the fluidized bed when the feed is at a temperature below ambient temperature.

6. The method of claim 1, wherein the one or more olefins comprise ethylene.

7. The method of claim 1, wherein the feed comprises ethylene.

8. The method of claim 1, wherein the feed comprises a recycle fluid recovered from the reactor.

9. The method of claim 1, wherein the feed comprises the one or more monomers, and wherein an amount of the one or more monomers introduced to the reactor by flowing the feed through the injection nozzle comprises less than about 30 wt % of the amount of the olefins consumed within the reactor.

10. The method of claim 2, wherein the second flow path is at least partially disposed about the first flow path.

11. The method of claim 1, wherein the catalyst and the feed contact one another within the nozzle.

12. The method of claim 1, wherein the catalyst and the feed flow through the nozzle without contacting one another, and wherein upon exiting the nozzle the catalyst and the feed contact one another within the fluidized bed.

13. The method of claim 1, wherein the catalyst comprises one or more Ziegler-Natta catalysts, one or more chromium-based catalysts, one or more metallocene catalysts, one or more bimetallic catalysts, or any combination thereof.

14. The method of claim 1 or 2, wherein the catalyst comprises at least one metallocene catalyst and at least one non-metallocene catalyst.

15. The method of claim 1 or 2, wherein the catalyst comprises at least one metallocene catalyst and at least one Group 15-containing catalyst.

16. The method of claim 15, wherein the Group 15-containing catalyst compound, is selected from those having the following structures:

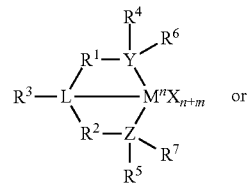

Formula I

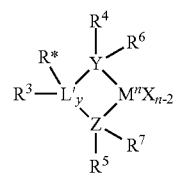

Formula II wherein

M is a Group 3 to 12 transition metal or a Group 13 or 14 main group metal;

each X is independently an anionic leaving group;

y is 0 or 1;

n is the oxidation state of M;

m is the formal charge of the ligand represented by YZL or YZL;

L is a Group 15 or 16 element;

L' is a Group 15 or 16 element or Group 14 containing group;

Y is a Group 15 element;

Z is a Group 15 element;

$R^1$ and $R^2$ are independently a $C_1$ to $C_{20}$ hydrocarbon group, a heteroatom containing group having up to twenty carbon atoms, silicon, germanium, tin, lead, or phosphorus;

$R^1$ and $R^2$ may also be interconnected to each other;

$R^3$ is absent, a hydrocarbon group, hydrogen, a halogen, or a heteroatom containing group;

$R^4$ and $R^5$ are independently an alkyl group, an aryl group, a substituted aryl group, a cyclic alkyl group, a substituted cyclic alkyl group, a cyclic aralkyl group, a substituted cyclic aralkyl group or a multiple ring system;

$R^4$ and $R^5$ may be interconnected to each other;

$R^6$ and $R^7$ are independently absent, hydrogen, an alkyl group, halogen, heteroatom, or a hydrocarbyl group; and R* is absent, hydrogen, a Group 14 atom containing group, a halogen, or a heteroatom containing group.

17. The method of claim 15 wherein the metallocene catalyst is selected from bis(n-propyl cyclopentadienyl)$MX_2$, (pentamethylcyclopentadienyl)(n-propylcyclopentadienyl) $MX_2$, bis(indenyl)$MX_2$, and (tetramethylcyclopentadienyl) (n-propylcyclopentadienyl) $MX_2$, wherein M is a Group 4 metal, and X is an anionic leaving group.

18. The method of claim 1, wherein the catalyst is a slurry of catalyst particles in an inert liquid.

19. The method of claim 1, wherein the catalyst is a solution of catalyst in an inert liquid.

* * * * *